United States Patent
Nguyen et al.

(10) Patent No.: US 7,586,982 B2
(45) Date of Patent: Sep. 8, 2009

(54) KALMAN FILTER BASED METHOD AND APPARATUS FOR LINEAR EQUALIZATION OF CDMA DOWNLINK CHANNELS

(75) Inventors: Hoang Nguyen, Davis, CA (US);
Jianzhong Zhang, Irving, TX (US);
Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 1093 days.

(21) Appl. No.: 10/431,179

(22) Filed: May 6, 2003

(65) Prior Publication Data
US 2004/0223480 A1 Nov. 11, 2004

(51) Int. Cl.
*H03H 7/30* (2006.01)
(52) U.S. Cl. .................. 375/233; 375/316; 708/323; 370/342
(58) Field of Classification Search .............. 375/233, 375/232, 230, 229, 377, 130, 140, 147, 316; 708/323; 370/342
See application file for complete search history.

(56) References Cited

U.S. PATENT DOCUMENTS

| | | | | |
|---|---|---|---|---|
| 5,539,774 | A * | 7/1996 | Nobakht et al. .............. | 375/232 |
| 5,867,411 | A * | 2/1999 | Kumar ......................... | 708/300 |
| 6,295,326 | B1 * | 9/2001 | Tonissen et al. ............. | 375/350 |
| 6,486,831 | B1 * | 11/2002 | Martorana et al. ........... | 342/458 |
| 6,628,707 | B2 * | 9/2003 | Rafie et al. .................. | 375/233 |
| 6,798,843 | B1 * | 9/2004 | Wright et al. ................ | 375/296 |
| 6,829,568 | B2 * | 12/2004 | Julier et al. .................. | 702/189 |
| 7,006,461 | B2 * | 2/2006 | Kilfoyle et al. ............. | 370/315 |
| 7,076,514 | B2 * | 7/2006 | Erdogan et al. ............. | 708/323 |
| 2002/0039391 | A1 * | 4/2002 | Wang et al. .................. | 375/316 |
| 2002/0193146 | A1 * | 12/2002 | Wallace et al. .............. | 455/562 |
| 2003/0227887 | A1 * | 12/2003 | Abrishamkar et al. ....... | 370/335 |
| 2007/0030827 | A1 * | 2/2007 | Rui et al. ..................... | 370/335 |

OTHER PUBLICATIONS

Chen et al., "Adaptive multiuser DFE with Kalman channel estimation for DS-CDMA systems in multipath fading channels", Signal Processing.Elsevier Science B.V., Oct. 21, 2000, pp. 713-733.
Chen et al., "Adaptive Joint Detection and Decoding in Flat-Fading Channels via Mixture Kalman Filtering", IEEE, Jun. 2000, p. 271.
Iltis, Ronald A., "A DS-CDMA Tracking Mode Receiver with Joint Channel/Delay Estimation and MMSE Detection", IEEE Transactions on Communications, vol. 49, No. 10, Oct. 2001, pp. 1770-1779.

(Continued)

*Primary Examiner*—Temesghen Ghebretinsae
(74) *Attorney, Agent, or Firm*—Harrington & Smith, PC

(57) ABSTRACT

Disclosed is a minimum mean square error (MMSE) equalizer and method for single-user detection of a signal received from a downlink code-division multiple access CDMA channel. The equalizer includes a Kalman filter having an input coupled to the received signal for generating a best linear unbiased estimate of a transmitted chip sequence for a single user. A reduced computational complexity Kalman filter embodiment is also disclosed that only periodically updates a Kalman filter prediction error covariance matrix P(k|k−1), a Kalman filter filtering error covariance matrix P(k|k) and the Kalman gain K(k).

37 Claims, 15 Drawing Sheets

OTHER PUBLICATIONS

Iltis, Ronald A., "Joint Estimation of PN Code Delay and Multipath Using the Extended Kalman Filter", IEEE Transactions on Communications, vol. 38, No. 10, Oct. 1990, pp. 1677-1685.

Iltis et al., "An Adaptive Multiuser Detector with Joint Amplitude and Delay Estimation", IEEE Journal on Selected Area in Communications, vol. 12, No. 5, Jun. 1994, p. 774-785.

Kim et al., "Joint Detection and Channel Estimation Algorithms for QS-CDMA Signals Over Time-Varying Channels", IEEE Transactions on Communications, vol. 50, No. 5, May 2002, pp. 845-855.

Krauss et al., "MMSE Equalization for Forward Link in 3G CDMA: Symbol-Level Versus Chip-Level", IEEE, 2000, pp. 18-22.

Lim et al., "The Kalman Filter as the Optimal Linear Minimum Mean-Squared Error Multiuser CDMA Detector", IEEE Transactions on Information Theory, vol. 46, No. 7, Nov. 2000, pp. 2561-2566.

Lim et al., "Adaptive Symbol and Parameter Estimation in Asynchronous Multiuser CDMA Detectors", IEEE Transactions on Communications, vol. 45, No. 2, Feb. 1997, pp. 213-220.

Lim et al., "An Asynchronous Multiuser CDMA Detector Based on the Kalman Filter", IEEE Journal on Selected Areas in Communications, vol. 16, No. 9, Dec. 1998, pp. 1711-1722.

Xu et al., "Blind Detection of CDMA Signals Based on Kalman Filter", IEEE, 2001, pp. 1545-1549.

* cited by examiner

KALMAN FILTER BASED METHOD AND APPARATUS FOR LINEAR EQUALIZATION OF CDMA DOWNLINK CHANNELS

TECHNICAL FIELD

This invention relates generally to Code Division Multiple Access (CDMA) receivers and, more specifically, relates to channel equalizers for use in CDMA downlink (base station to mobile station) receivers.

BACKGROUND OF THE INVENTION

The following abbreviations will be employed in the following description of the background art and in the description of the presently preferred embodiments of this invention:
BIBO: bounded-input bounded-output
BLER: block error rate
BLUE: best linear unbiased estimator
cFIR: chip finite impulse response
EKF: extended Kalman filter
FIR: finite-impulse response
KF: Kalman filter
LMMSE: linear minimum mean squared error
MIMO: multiple input multiple output
MMSE: minimum mean squared error
SISO: single input single output
swRLS: sliding window recursive least squares
QAM: quadrature amplitude modulation.
QPSK: quadrature phase shift key Channel equalization is necessary for improving the performance of downlink CDMA receivers. The existence of a multipath channel destroys the orthogonality among the spreading codes, as clearly seen from the fact that the RAKE receiver in many cases reaches a noise floor at a frame error rate above 0.1. One of the simplest ways of improving the receiver performance, for downlink single-user detection, is to restore the code orthogonality. This is motivated in part by the fact that in single-user detection the receiver does not know the spreading codes of the interfering users, which are required by some of the previously proposed multi-user detection techniques of the prior art.

Well-known methods in the literature for orthogonality restoration rely on LMMSE FIR equalizers, realized either at the chip level or the symbol level. These equalizers may be provided in an adaptive or in a non-adaptive/block form. The block implementation requires a matrix inversion for every segment of data over which the observation sequence is considered stationary. Frequent matrix inversions may, however, impose a severe computational burden on the receiver.

The symbol-level LMMSE equalizer of T. P. Krauss, W. J. Hillery, and M. D. Zoltowsky, "MMSE equalization for forward link in 3G CDMA: symbol-level versus chip-level," Tenth IEEE workshop on Stat. Signal and Array Proc., 2000 requires one matrix inversion per segment. This equalizer, in essence, is a chip-level LMMSE equalizer that incorporates the descrambling and the despreading operations, typically done outside of the equalizer. Its objective, however, is to minimize the error variance of the symbol estimate rather than of the chip estimate. On the other hand, matrix inversion can be avoided totally by means of adaptive equalizers. Adaptive implementations can be performed in a number of ways. A well-known technique uses the stochastic gradient algorithm, from which the Griffiths algorithm is derived by replacing the covariance matrix with a rank-1 approximation. However, stochastic gradient-based algorithms suffer from slow convergence and tend to be unreliable. A better alternative is to update the covariance matrix continually in the weighted-average recursive fashion $R(t+1)=\lambda R(t)+(1-\lambda)y(t+1)y^H(t+1)$ which has an adaptive inverse form, with $v_{(l)}$ being the forgetting factor. In many cases, however, even this recursion is not sufficiently reliable.

The Kalman filter (KF) is a powerful statistical method suitable for the estimation/tracking of not only stationary but also non-stationary processes. Reference in this regard can be made to M. H. Hayes, Statistical Digital Signal Processing and Modeling, John Wiley & Sons, Inc.: New York, N.Y., 1996, and to R. E. Kalman, "A new approach to linear filtering and prediction problems," Trans. ASME, J. Basic Engineering, ser. 82D, pp. 35-45, March 1960. Several authors, most notably Iltis et al (R. A. Iltis and L. Mailaender, "An adaptive multiuser detector with joint amplitude and delay estimation," IEEE J. Selected Areas in Com., vol. 12, pp. 774-85, June 1994, and R. A. Iltis, "Joint estimation of PN code delay and multipath using the extended Kalman filter," IEEE Trans. Com., vol. 38, pp. 1677-85, October 1990) may have used Kalman filtering for joint signal detection and parameter estimation. It can be noted in this regard that these authors use the extended Kalman filter (EKF) for amplitude and delay estimation. The true state-space formulation involving delay parameters manifests a nonlinear system, due to the fact that the observation is nonlinear with respect to the delays. Hence, the basic principle of the EKF is to linearize the observation equation, by means of the first-order Taylor series expansion; the state dynamics is described by imposing a Gauss-Markov model onto the state evolution. More work of this nature on delay estimation using the EKF can be found in T. J. Lim and L. K. Rasmussen, "Adaptive symbol and parameter estimation in asynchronous multiuser CDMA detectors," IEEE Trans. on Com., vol. 45, pp. 213-20, February 1997; R. A. Iltis, "A DS-CDMA tracking mode receiver with joint channel/delay estimation and MMSE detection," IEEE Trans. on Com., vol. 49, pp. 1770-9, October 2001; and in K. J. Kim and R. A. Iltis, "Joint detection and channel estimation algorithms for QS-CDMA signals over time-varying channels," IEEE Trans. on Com., vol. 50, pp. 845-55, May 2002.

Other authors have discussed techniques that are more relevant to CDMA downlink equalization than the above-mentioned references: T. J. Lim, L. K. Rasmussen, and H. Sugimoto, "An asynchronous multiuser CDMA detector based on the Kalman filter," IEEE J. on Select. Areas in Com., vol. 16, pp. 1711-22, December 1998; T. J. Lim and Y. Ma, "The Kalman filter as the optimal linear minimum mean-squared error multiuser CDMA detector," IEEE Trans. Info. Theory, vol. 46, pp. 2561-6, November 2000; Z. Xu and T. Wang, "Blind detection of CDMA signals based on Kalman filter," in Record of the 35$^{th}$ Asilomar Conf. on Signals, Systems and Computers, vol. 2, pp. 1545-9, 2001; and L.-M. Chen, B.-S. Chen, and W.-S. Hou, "Adaptive multiuser DFE with Kalman channel estimation for DS-CDMA systems in multipath fading channels," Elsevier Signal Processing, vol. 81, pp. 713-33, 2001. Most interesting perhaps is the state-space formulation of T. J. Lim, L. K. Rasmussen, and H. Sugimoto, "An asynchronous multiuser CDMA detector based on the Kalman filter," IEEE J. on Select. Areas in Com., vol. 16, pp. 1711-22, December 1998. In this formulation, each element of the state vector includes the channel taps and the transmitted symbols of all users. What makes this formulation interesting, in particular, is the fact that it yields the symbol estimate (rather than the chip estimate). The KF for this model operates at the chip level (rather than at the symbol level); and such a strategy avoids matrix inversion in computing the Kalman gain, while taking advantage of the ability of the KF to handle nonstationary dynamics, i.e., a time-varying state-dynamics matrix.

Another state-space formulation of interest is presented in T. J. Lim and Y. Ma, "The Kalman filter as the optimal linear minimum mean-squared error multiuser CDMA detector," IEEE Trans. Info. Theory, vol. 46, pp. 2561-6, November 2000, where the state vector consists of all users' transmitted symbols at the current time epoch, and the measurement matrix is the product of the channel matrix and one consisting of the spreading codes. This formulation leads to a state-space model that requires a matrix inversion per symbol interval; and the size of the Hermitian matrix to be inverted is no less than the processing gain. A state-space model similar to the one proposed by T. J. Lim and Y. Ma can be found in L.-M. Chen, B.-S. Chen, and W.-S. Hou, "Adaptive multiuser DFE with Kalman channel estimation for DS-CDMA systems in multipath fading channels," Elsevier Signal Processing, vol. 81, pp. 713-33, 2001. Other state-space formulations can be found in L.-M. Chen, B.-S. Chen, and W.-S. Hou, "Adaptive multiuser DFE with Kalman channel estimation for DS-CDMA systems in multipath fading channels," Elsevier Signal Processing, vol. 81, pp. 713-33, 2001, and in R. Chen, X. Wang, and J. S. Liu, "Adaptive joint detection and decoding in flat-fading channels via mixture Kalman filtering," IEEE Trans. Info. Theory, vol. 46, pp. 2079-94, September 2000, which impose linear statistical dynamic models onto the channel.

In conclusion, all of the above-mentioned state-space formulations require knowledge of all users' spreading codes, making them suitable for multi-user detection but inappropriate for single-user detection.

In general, the problem was approached in the prior art by employing either of the following frameworks: (i) multi-user detection (linear or nonlinear, the latter more complicated and having better error performance) which requires knowledge of all user codes and has a complexity that increases with the number of users, and (ii) single-user detection with variants of FIR LMMSE equalizers that restores the orthogonality of user codes.

A need thus exists to provide a state-space approach, either at the symbol level or the chip level, that is well-suited for single-user detection in a CDMA downlink receiver.

SUMMARY OF THE PREFERRED EMBODIMENTS

The foregoing and other problems are overcome, and other advantages are realized, in accordance with the presently preferred embodiments of these teachings.

A method of this invention provides a new single-user detection approach that employs the Kalman filter with a novel state-space description of the downlink signal. The KF can be viewed as a variable length filter that elongates over time, although no actual filter taps are computed.

This invention also provides, in one aspect thereof, a sliding window RLS-like algorithm that is robust, stable, and has an improved tracking capability as compared to the weighted-average recursive form when used in fast fading environments. Since chip-level equalization of SISO channels based on the MMSE FIR filter principle has been well studied, this invention focuses on, but is not limited to, FIR MMSE implementations on MIMO systems.

A Kalman filter based linear equalization method for the CDMA downlink is described. The downlink CDMA signal is represented by a state-space model. With this formulation, the Kalman filter is used to obtain a BLUE of the transmitted chip sequence. An advantage of the state-space model is the fact that the equalization method is applicable directly to single-user detection; i.e., it does not require knowledge of the interfering users' spreading codes, and its complexity does not increase with the number of users. Furthermore, taking advantage of the quasi block-wise stationarity property of the signal, a method for reducing the computational complexity is also described. It is believed that the Kalman-filter based approach of this invention may offer a significant, for example, an approximately 2 dB, improvement over the conventional FIR filter-based LMMSE approach in terms of error performance. Furthermore, the reduced complexity approach provides a similar performance gain in many cases.

Suitable and non-limiting applications of this method include downlink CDMA mobile devices, such as cellular telephones, that comply with either the CDMA2000 or Wideband CDMA (WCDMA) standards.

In a preferred embodiment the algorithm is implemented in software form imbedded in a general-purpose signal processing chip or, for increased speed, in a special-purpose chip. As with other non-blind equalization methods, the preferred embodiment assumes that an estimate of the channel parameters is available from a receiver channel estimator.

This invention is described in the non-limiting context of methods and apparatus for performing equalization of SISO and MIMO downlink CDMA channels. The methods preferably employ a minimum mean squared error (MMSE) criterion. To achieve this objective, two categories of methods are presented.

The first category of methods utilizes the Kalman filter (KF) with the state-space representation of the channel model. The KF is realized both at the chip level and the symbol level. Since the scrambling code is known to the receiver, the symbol-level Kalman filter (SKF) may, with higher computational complexity, track the non-stationary behavior of the transmitted signal. The chip-level Kalman filter (CKF) may also track the non-stationarity of the downlink received signal, and requires significantly lower computational power than the SKF.

The second category of methods minimizes the MSE criterion applied to the received signal based on FIR filters. A preferred method of this category is the above-mentioned sliding window RLS-like adaptive algorithm, which is shown to be appropriate for fast tracking. A technique for reducing the KF's complexity is also presented.

Although the SKF can, in principle, completely track any non-stationarity, its practical application to CDMA may be limited to some degree due to a requirement to perform a matrix inversion every symbol; nevertheless, being considered the best linear unbiased estimator (BLUE), it can be used as a basis for performance comparison. The CKF, however, does not require matrix inversion. As such, while its performance is comparable to that of the SKF, its (reduced) computational complexity is comparable to that of the chip-level FIR (cFIR) LMMSE equalizer.

The disclosed state-space formulations, either at the symbol level or the chip level, are suitable for use in single-user detection on the CDMA downlink, an objective of which is to restore the spreading code orthogonality.

Disclosed herein is a MMSE equalizer and method for single-user detection of a signal received from a downlink CDMA channel. The equalizer includes a Kalman filter having an input coupled to the received signal for generating a best linear unbiased estimate of a transmitted chip sequence for a single user. A reduced computational complexity Kalman filter embodiment is also disclosed that only periodically updates a Kalman filter prediction error covariance matrix P(k|k−1), a Kalman filter filtering error covariance matrix P(k|k) and the Kalman gain K(k).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

By way of introduction, and since the Kalman filter algorithm is widely known, the derivation of same is not repeated for each state-space model discussed below. Instead, a generic form of the Kalman algorithm is summarized in Table I.

For the various applications considered herein, the time index k stands for the symbol index n when applied to the symbol-level state-space models, or for the chip index i when applied to the chip-level state-space models.

TABLE I

Summary of the Kalman filter

State-space model:

$x(k) = A(k)x(k-1) + w(k)$
$y(k) = H(k)x(k) + v(k)$

TABLE I-continued

Summary of the Kalman filter

Notation:

$x(k|k)$ = the BLUE of $x(k)$ based on all past observations $\{y(l): l \leq k\}$
$Q_w(k) = E[w(k)w^H(k)]$
$Q_v(k) = E[v(k)v^H(k)]$ Assumption:

$E[w(k)w^H(l)] = Q_w(k)\delta(k-l)$: whiteness of the state noise
$E[v(k)v^H(l)] = Q_v(k)\delta(k-l)$: whiteness of the measurement noise
$E[w(k)v^H(l)] = 0$: state noise and measurement noise uncorrelated Initialization:

$x(0|0) = E[x(0)]$
$P(0|0) = E\{[x(0) - x(0|0)][x(0) - x(0|0)]^H\} \geq 0$

Figure 9A:
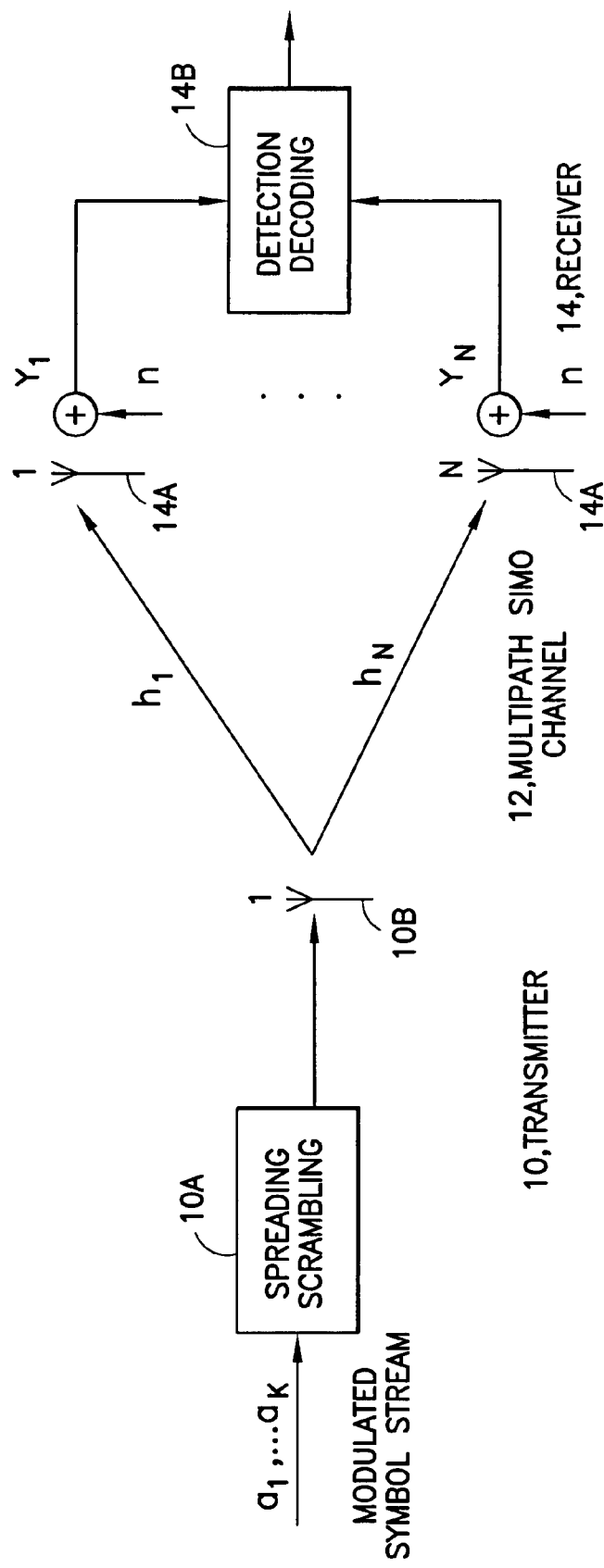
FIG. 9A is a block diagram showing a SIMO transmitter, a multipath SIMO channel, and a SIMO receiver.
Figure 9B:
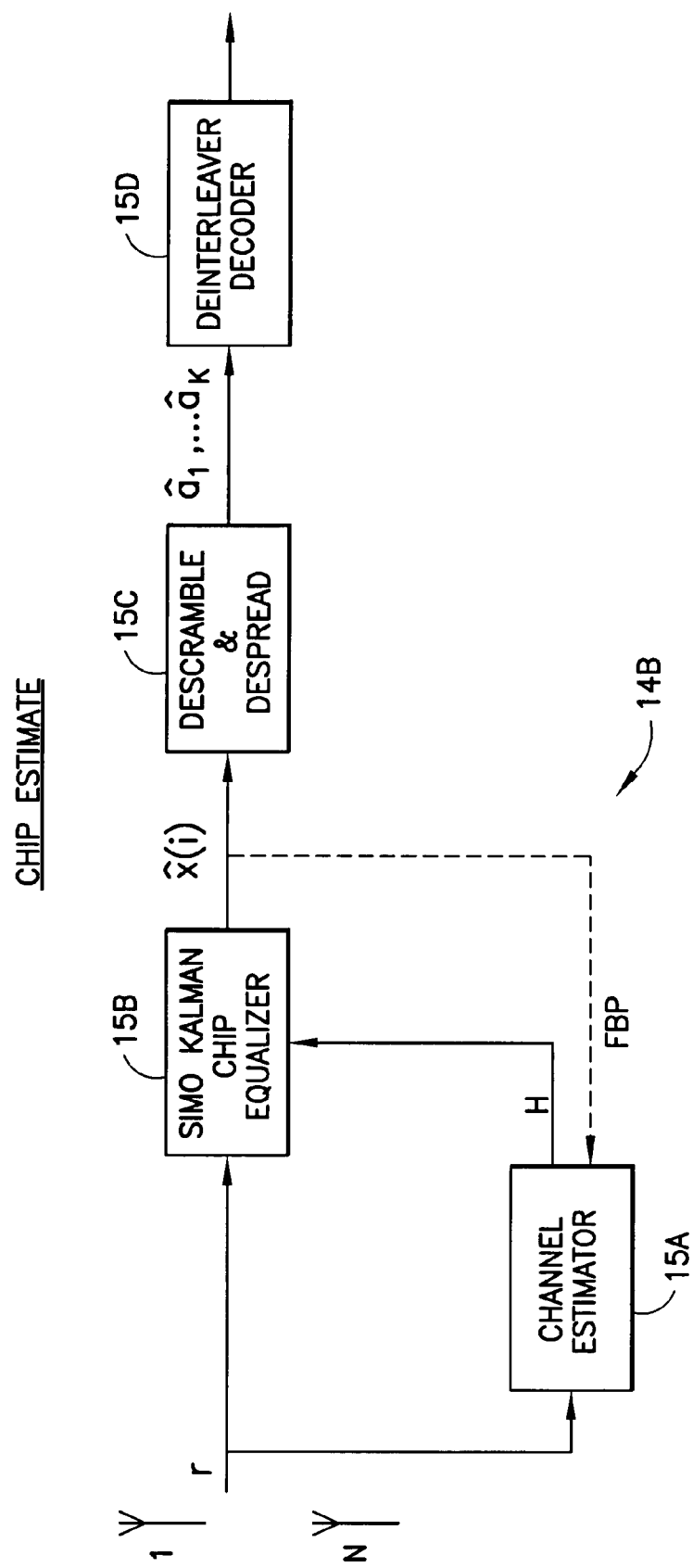
FIG. 9B is a block diagram of a portion of the SIMO receiver shown in FIG. 9A, and shows the SIMO Kalman filter-based equalizer in accordance with an aspect of this invention.

Recursion: for $k = 1, 2, \ldots$, compute $x(k|k-1) = A(k)x(k-1|k-1)$
$P(k|k-1) = A(k)P(k-1|k-1)A^H(k) + Q_w(k)$
$K(k) = P(k|k-1)H^H(k)[H(k)P(k|k-1)H^H(k) + Q_v(k)]^{-1}$
$x(k|k) = x(k|k-1) + K(k)[y(k) - H(k)x(k|k-1)]$
$P(k|k) = [I - K(k)H(k)]P(k|k-1)$ Before discussing the Kalman-filter based equalizer embodiments in accordance with this invention, reference is first made to FIGS. 9A, 9B, 10A and 10B for showing embodiments of SISO and MIMO RF communication systems. FIG. 9A is a block diagram showing a SIMO transmitter 10, a multipath SIMO channel 12 and a SIMO receiver 14. The transmitter 10 includes a spreading and scrambling block 10A that receives an input modulated (e.g., QPSK or QAM) symbol. stream $\alpha_1, \ldots, \alpha_K$ and that provides the spread and scrambled symbol stream to an transmit antenna 10B. The symbol stream is transmitted through the multipath downlink channel to N antennas 14A of the receiver 14, and applied to a receiver detection and decoding block 14B. FIG. 9B is a block diagram of the detection and decoding block 14B of the SIMO receiver 14. After being demodulated and sampled the received signal r is applied to a channel estimator 15A, that outputs a channel estimate H to the SIMO Kalman chip equalizer 15B. The received signal r is also applied to the SIMO Kalman chip equalizer 15B. The equalizer 15B outputs chip estimates to a descramble and despread block 15C. The descramble and despread block 15C outputs a descrambled and despread symbol stream to a deinterleaver and decoder block 15D.

Figure 10A:
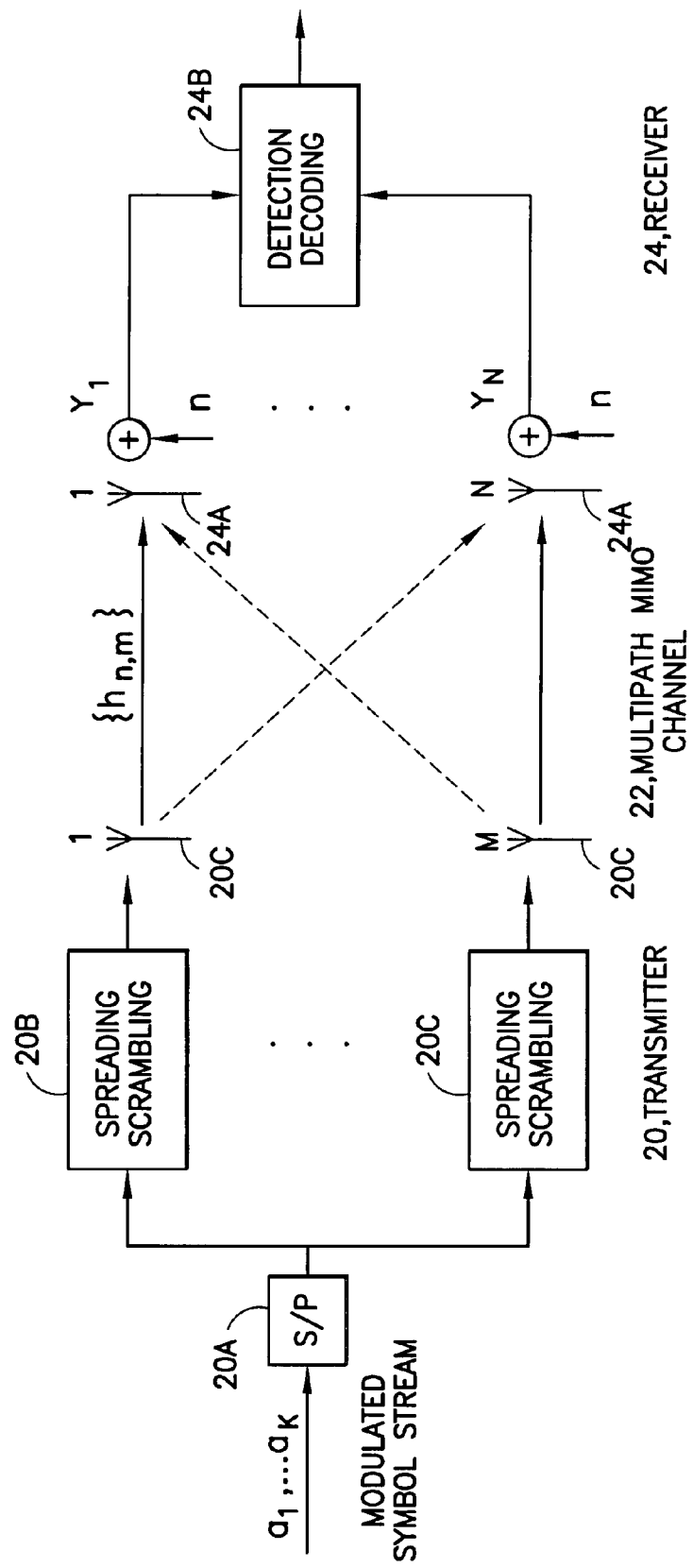
FIG. 10A is a block diagram showing a MIMO transmitter, a multipath MIMO channel, and a MIMO receiver.
Figure 10B:
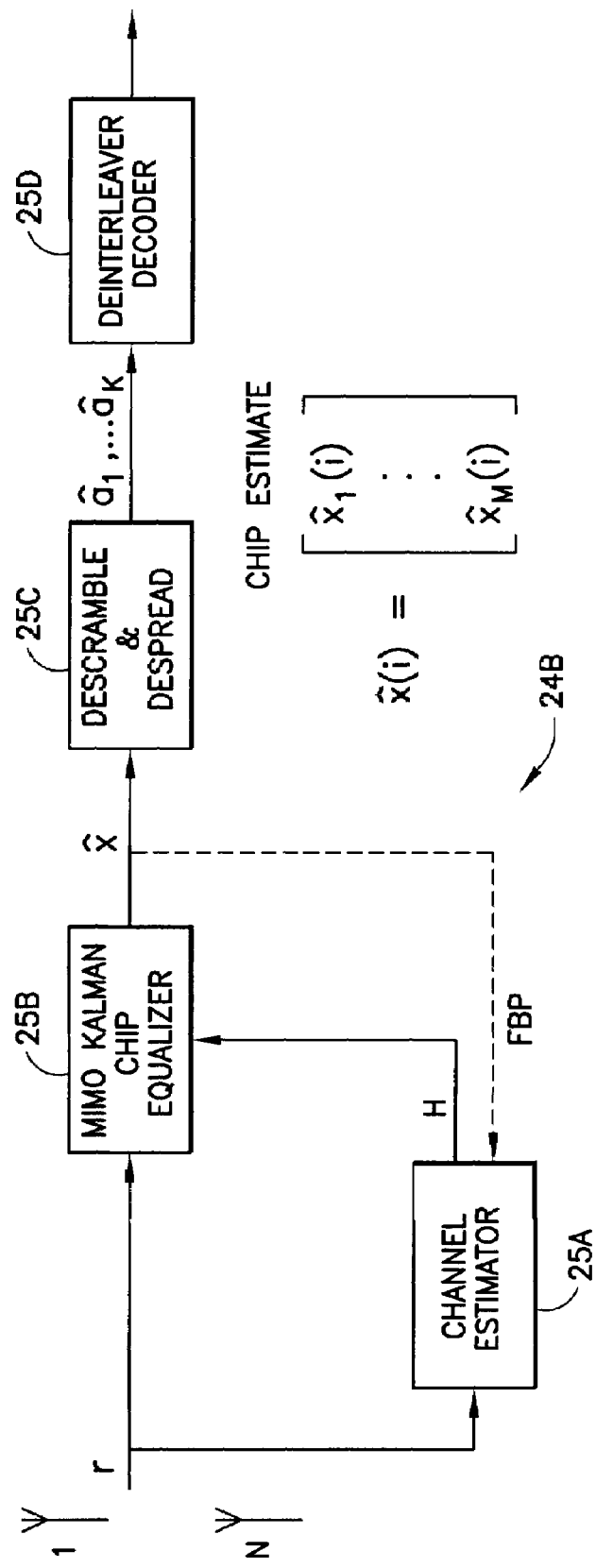
FIG. 10B is a block diagram of a portion of the MIMO receiver shown in FIG. 10A, and shows the MIMO Kalman filter-based equalizer in accordance with an aspect of this invention.

FIG. 10A is a block diagram showing a MIMO transmitter 20, a multipath MIMO channel 22 and a MIMO receiver 24. The transmitter 20 includes a serial to parallel converter (S/P) 20A that outputs M versions of the modulated symbol stream to M spreading and scrambling blocks 20B. Spreading and scrambling blocks 20B each out the spread and scrambled symbol stream to an associated one of M transmit antennas 20C. The symbol stream is transmitted through the multipath downlink MIMO channel 22 to N antennas 24A of the receiver 24, and applied to a receiver detection and decoding block 24B. FIG. 10B is a block diagram of the detection and decoding block 24B of the MIMO receiver 24. After being demodulated and sampled the received signal r is applied to a channel estimator 25A, that outputs a channel estimate H to the MIMO Kalman chip equalizer 25B. The received signal r is also applied to the MIMO Kalman chip equalizer 25B. The equalizer 25B outputs chip estimates to a descramble and despread block 25C. The descramble and despread block 25C outputs a descrambled and despread symbol stream to a deinterleaver and decoder block 25D.

In the preferred, but non-limiting, embodiment of this invention the transmitters 10 and 20 are associated with CDMA base stations, and the receivers 14 and 24 are associated with CDMA mobile stations, such as cellular telephones.

A discussion is first made of the SISO signal model.

Consider a U-user system where the transmitted signal belonging to the uth user is $$x_u(i) = A_u a_u(\lfloor i/F \rfloor) s_u(|i|_F). \tag{1}$$

Here, i denotes the chip index, $A_u$ the signal amplitude, $a_u(n)$ the nth transmitted symbol, $\underline{s}_u = [s_u(0), \ldots, s_u(F-1)]^Y$ the spreading sequence, and F the spreading factor. The notation $\lfloor \cdot \rfloor$ denotes the floor function and $|\cdot|_F$ denotes the modulo-F reduction. The total transmitted signal is the sum of all user signals scrambled by the scrambling sequence c(i):

$$x(i) = c(i) \sum_{u=1}^{U} x_u(i). \tag{2}$$

In SISO systems with M transmit and N receive antennas, the signal impinging upon the rth receive antenna is given by $$y_r(i) = \sum_{t=1}^{M} [h^t_{r,0}, \ldots, h^t_{r,D}] \begin{bmatrix} x(i) \\ \vdots \\ X(i-D) \end{bmatrix} + v_r(i) \tag{3}$$

for $r = 1, \ldots, N$. Here, $h^t_{r,l}$ denotes the lth tap of the channel impulse response between the tth transmit antenna and the rth receive antenna. The measurement noise processes $v_r(i)$ are assumed to be white Gaussian and uncorrelated. This transmission scheme is of simple diversity where the same information sequence is transmitted via all transmit antennas.

The symbol-level SISO state-space model is next considered.

In this section the state-space model for the SKF is developed. As its name implies, the SKF updates the state estimate at each symbol epoch. Specifically, at the nth symbol interval, the best linear unbiased estimate (BLUE) of $[x(nF+F-1), \ldots, x(nF)]$ is sought based on all past observations $\{y_r(i) | i \leq nF+F-1, r = 1, \ldots, N\}$. To this end, let us define $$y_r(n) \equiv [y_r(nF+F-1), \ldots, y_r(nF)]^T. \tag{4}$$

From (3) it follows that $$y_r(n) = H_r(n)x(n) + \tilde{y}_r(n) + v_r(n) \tag{5}$$

where $$H_r(n) \equiv \sum_{t=1}^{M} \begin{bmatrix} h^t_{r,0} & \cdots & h^t_{r,D} & 0 \\ & \ddots & \ddots & \ddots \\ 0 & & h^t_{r,0} & \cdots & h^t_{r,D} \end{bmatrix} : F \times (F+D) \tag{6}$$

$$v_r = [v_r(nF+F-1), \ldots, v_r(nF)]^T \tag{7}$$

$$x(n) \equiv [x(nF+F-1), \ldots, x(nF-D)]^T. \tag{8}$$

The term $\tilde{y}_r(n)$ in (5) represents the channel response due to the known pilots. When there is more than one transmit antenna, the pilots cannot be lumped into x(n) and, hence, ỹr(n) cannot be combined with the first term in (5). Since the channel matrix $H_r(n)$ may vary, possibly slowly, from symbol to symbol, its explicit dependence on n is indicated. The vector of all the observed data at symbol interval n is obtained by stacking the observations from the individual antennas, i.e., $$y(n) \equiv [y_1^T(n), \ldots, y_N^T(n)]^T. \tag{9}$$

The measurement equation can thus be written as $$y(n) = H(n)x(n) + \tilde{y}(n) + v(n) \tag{10}$$

where $$H(n) \equiv [H_1^T(n), \ldots, H_N^T(n)]^T \tag{11}$$

$$v(n) \equiv [v_1^T(n), \ldots, v_N^T(n)]^T, \tag{12}$$

and ỹ(n) is the contribution from all the pilots. The state dynamics is described by $$x(n) = A(n)x(n-1) + w(n). \tag{13}$$

By inspection, it is seen that $$A(n) = \begin{bmatrix} 0_{F \times D} & 0_{F \times F} \\ I_D & 0_{D \times F} \end{bmatrix} \tag{14}$$

$$w(n) = [x(nF+F-1), \ldots, x(nF), 0, \ldots, 0]^T \tag{15}$$

where $I_D$ is the identity matrix of size D; $0_{a \times b}$ is an a×b zero matrix, and w(n) is called the state noise process. Although the state noise is white, it is nonstationary due to the presence of the long (scrambling) code. In particular, its covariance matrix is time-varying and takes the form $$Q_w(k,n) \equiv E[w(k)w^H(n)] = \delta(k-n)Q_w(n) \tag{16}$$

where $\delta(\cdot)$ is the Kronecker delta function and $$Q_w(n) = \begin{bmatrix} \tilde{Q}_w(n) & 0 \\ 0 & 0 \end{bmatrix} \tag{17}$$

$$\tilde{Q}_w(n) = C(n)R_{ss}C^H(n) \tag{18}$$

$$R_{ss} \equiv E\left[\sum_{u=1}^{U} |A_u|^2 \tilde{s}_u \tilde{s}_u^H\right] \tag{19}$$

$$\tilde{s}_u = [s_u(F-1), \ldots, s_u(0)]^H \tag{20}$$

$$C(n) = diag(c(nF+F-1), \ldots, c(nF)). \tag{21}$$

The measurement noise process v(n) is assumed to be white and Gaussian with covariance matrix $$Q^v = \sigma_v^2 I_{BF}. \tag{22}$$

It is reasonable to assume that the measurement noise variance $\sigma_v^2$ is known from the front-end noise figure. It should be noted that an adaptive routine for estimating $\sigma_v^2$ can also be employed. If the matrix $R_{ss}$ is unknown to the receiver, it may be approximated by $$\hat{R}_{ss} = \sigma_x^2 I_F \tag{23}$$

$$\sigma_x^2 \equiv E[|x(i)|^2] = \sum_{u=1}^{U} |A_u|^2 \quad (24)$$

where $\sigma_x^2$ represents the total transmitted power. Simulation results indicate that $R_{ss}$ and $\hat{R}_{ss}$ yield similar performances, i.e. the performance loss when using $\hat{R}_{ss}$ in place of $R_{ss}$ is small in general and is almost nonexistent in a 25-user SISO system. The form of the approximation (23) becomes exact when the system is fully loaded (i.e., U=F) and the users have equal powers; in which case it follows from (19) that $$R_{ss}|_{U=F, A_u=const=A_o} = A_o^2 F I_F. \quad (25)$$

The approximation (23) is, thus, motivated by (25) and holds relatively well for normally to highly loaded systems. It is also possible to devise and incorporate into the KF a recursive routine for estimating $\tilde{Q}_w(n)$.

Due to the presence of $\tilde{y}(n)$, a slight modification takes place in the filtered state update which now takes the form $$x(n|n) = x(n|n-1) + K(n)[y(n) - \tilde{y}(n) - H(n)x(n|n-1)]. \quad (26)$$

The chip-level SISO state-space model is now considered.

It can be seen from the previous section that the symbol-level Kalman filter, is expensive since it requires the inversion of a matrix of size NF every symbol period. In this section the state-space model for the CKF is developed which requires a much lower computational power than the SKF. As its name implies, the CKF updates the state estimate at each chip epoch. Specifically, at the ith chip interval, the best linear unbiased estimate of x(i) is sought based on all past observations $\{y_r(k)| \leq i, r=1, \ldots, N\}$. To this end, let us define $$y(i) \equiv [y_1(i), \ldots, y_N(i)]^T. \quad (27)$$

From (3) it follows that $$y(i) = H(i)x(i) + \tilde{y}(i) + v(i) \quad (28)$$

where $$H(i) \equiv [h_1(i), \ldots, h_N(i)]^T \quad (29)$$

$$x(i) \equiv [x(i), \ldots, x(i-D)]^T \quad (30)$$

$$h_r(i) = \sum_{t=1}^{M} [h_{r,0}^t(i), \ldots, h_{r,D}^t(i)]^T \quad (31)$$

$$v(i) \equiv [v_1^T(i), \ldots, v_N^T(i)]^T \quad (32)$$

and the term $\tilde{y}(i)$ in (28) represents the channel response due to the known pilot sequences. As in the symbol-level model, the pilots cannot, except the case where M=1, be lumped into x(i) since they are different for different transmit antennas. To describe the dynamics of the state, let us define $$A(i) = \begin{bmatrix} 0_{1 \times D} & 0 \\ I_D & 0_{D \times 1} \end{bmatrix} \quad (33)$$

$$w(i) = [x(i), 0, \ldots, 0]^T. \quad (34)$$

Now one has the standard state equation $$x(i) = A(i)x(i-1) + w(i). \quad (35)$$

In the development of the chip-level state-space model, it is assumed that the scrambled transmitted sequence is white, i.e., $$Q_w(k,n) \equiv E[w(k)w^H(n)] = \delta(k-n)Q_w \quad (36)$$

where $$Q_w = diag(\sigma_x^2, 0, \ldots, 0). \quad (37)$$

As before, the measurement noise process v(n) is assumed to be white and Gaussian with covariance matrix $$Q_v = \sigma_v^2 I_N. \quad (38)$$

As in the symbol-level case, the filtered state update is computed according to $$x(i|i) = x(i|i-1) + K(i)[y(i) - \tilde{y}(i) - H(i)x(i|i-1)]. \quad (39)$$

Having thus described the SISO system, a description is now made of the equalization of MIMO downlink channels.

For MIMO systems, it can be assumed that the transmit antennas carry uncorrelated data streams. Nonetheless, the same set of spreading codes is used for every transmit antenna. In the sequel, the superscript t, such as in $x_u^t(i)$, is used to denote the transmit antenna index. Other notations are as previously defined unless otherwise redefined.

A discussion is now made of the MIMO signal model.

Consider a U-user system where the signal of the uth user transmitted via the tth antenna is $$x_u^t(i) = A_u a_u^t(\lfloor i/F \rfloor) s_u(i|_F) \quad (40)$$

The total signal transmitted from antenna t is the sum of all user signals scrambled by the scrambling sequence c(i):

$$x^t(i) = c(i) \sum_{u=1}^{U} x_u^t(i). \quad (41)$$

In MIMO systems with M transmit and N receive antennas, the signal impinging upon the rth receive antenna is given by $$y_r(i) = \sum_{t=1}^{M} [h_{r,0}^t(i), \ldots, h_{r,D}^t(i)] \begin{bmatrix} x^t(i) \\ \vdots \\ x^t(i-D) \end{bmatrix} + v_r(i) \quad (42)$$

$$= h_r^t(i) \times (i) + v_r(i) \quad (43)$$

$$= h_r^T(i)x(i) + v_r(i) \quad (43)$$

where $$h_r(i) \equiv [h_r^{1T}(i), \ldots, h_r^{MT}(i)]^T \quad (44)$$

$$x(i) \equiv [x^{1T}(i), \ldots, x^{MT}(i)] \quad (45)$$

$$h_r^t(i) \equiv [h_{r,0}^t(i), \ldots, h_{r,D}^t(i)]^T \quad (46)$$

$$x^t(i) \equiv [x^t(i), \ldots, x^t(i-D)]^T \quad (47)$$

for t=1, ..., M and r=1, ..., N. Note that the superscript T denotes matrix transposition; e.g., $x^{1T}(i)$ is the transpose of $x^1(i)$. The measurement noise processes $v_r(i)$ are assumed to be i.i.d. white Gaussian noise such that $E[v_r(k)v_s^*(l)] = \delta(r-s)\delta(k-l)\sigma_v^2$.

Next, the MIMO chip FIR LMMSE equalizer is discussed.

In this section there is presented a FIR equalizer method based on the LMMSE framework. It is commonly perceived that adaptive/recursive FIR LMMSE equalizers tend to be unreliable and sensitive to the design parameters such as the step size and the forgetting factor. More reliable implementations of FIR LMMSE equalizers appear in the block form, which requires inversion of a large-size autocorrelation matrix. Although the conventional FFT-based approach is applicable to single-transmit-antenna systems with, or without, receive diversity (in temporal or spatial form), it is still not known as to whether the method is suitable for MIMO systems with multiple transmit antennas. Motivated by these shortcomings, an adaptive FIR equalizer is described having the sliding window recursive least squares (swRLS) form. The swRLS algorithm is as reliable and has good tracking capability as the block FIR LMMSE equalizer.

The class of FIR LMMSE equalizers seeks to minimize the MSE criterion $$J(i;G_i) \equiv E[\|e_i\|^2] \tag{48}$$

where $$e_i \equiv x_i - \hat{x}_i \tag{49}$$

$$x_i \equiv [x^1(i), \ldots, x^M(i)]^T \tag{50}$$

and $\hat{x}_i$ is the LMMSE estimate of $x_i$ obtained by passing the observations through a multidimensional FIR filter. That is, $$\hat{x}_i = G_i y_i \tag{51}$$

where $$y_i \equiv [y^T(i+\delta), \ldots, y^T(i+\delta-L)]^T \tag{52}$$

$$y(i) \equiv [y_1(i), \ldots, y_N(i)]^T. \tag{53}$$

Here, the parameters L and δ are referred to as the equalizer order and the number of precursor (or noncausal) taps, respectively. The MSE in (48) is to be optimized over the M×(L+1)N matrix $G_i$, i.e., $$G_i = \operatorname*{argmin}_{G} J(i; G). \tag{54}$$

There are many techniques to perform the optimization (54). One way is to rewrite (51) by vectorizing the matrix $G_i$, which, conceptually, requires the inverse of a large matrix of order M(L+1)N. Here let us take the most expedient approach. From (48), (49), and (51), we have $$J(i;G_i) \equiv E\{tr([x_i - G_i y_i][x_i - G_i y_i]^H)\} \tag{55}$$

where tr(·) denotes the trace operator. Using the chain rule for differentiation and the fact that $$\frac{\partial}{\partial G} tr(GM) = M^H \tag{56}$$

we find, by setting to zero the derivative of (55) with respect to $G_i$, that $$E\{[x_i - G_i y_i] y_i^H\} = 0 \tag{57}$$

which yields $$G_i = R_{xy}(i) R_i^{-1} \tag{58}$$

with $$R_{xy}(i) \equiv E[x_i y_i^H] \tag{59}$$

$$R_i \equiv E[y_i y_i^H]. \tag{60}$$

Knowing the channel impulse response, or having an estimate thereof, the cross-correlation (59) is easy to compute. With the assumption that the transmitted signals are chip-white and uncorrelated, i.e., $$E[x^t(k)x^{s*}(l)] = \delta(t-s)\delta(k-l)\sigma_t^2, \tag{61}$$

where $\sigma_t^2 \equiv E[|x^t(i)|^2]$ is the total power of the tth transmit antenna, we have $$R_{xy}(i) = [V(\delta)H^H(i+\delta), \ldots, V(\delta-L)H^H(i+\delta-L)]: M \times (L+1)N \tag{62}$$

with $$V(l) \equiv \begin{bmatrix} v_1^T(l) & & 0 \\ & \ddots & \\ 0 & & v_M^T(l) \end{bmatrix} : M \times (D+1)M \tag{63}$$

$$v_t(l) \equiv \begin{cases} \left[0, \ldots, 0, \underbrace{\sigma_t^2}_{l+1 \text{st position}}, 0, \ldots, 0\right]^T, & \text{for } 0 \leq l \leq D \\ 0^T, & \text{otherwise} \end{cases} \tag{64}$$

$$(D+1) \times 1$$

$$H(i) \equiv [h_1(i), \ldots, h_N(i)]^T : N \times (D+1)M. \tag{65}$$

Due to (64), it is only when $0 \leq l \leq D$ that V(l) is nonzero and in that case V(l) has only M nonzero elements, which can be pre-computed offline.

Now, the actual computational issue is one posed by the matrix inversion in (58). In the block LMMSE approach, the autocorrelation matrix $R_i$ is approximated by the sample average $$\hat{R}_{yy}(m) = \frac{1}{K} \sum_{l=0}^{K-1} y(mK+l) y^H(mK+l) \tag{66}$$

and is assumed to hold constant over a block of K chips, with m denoting the block index. Matrix inversion is thus required once every block.

To avoid matrix inversion, let us now develop a chip-recursive swRLS form for the inverse autocorrelation matrix $P_i \equiv R_i^{-1}$. Similar to (66), we approximate $R_i$ by the sample average $$\hat{R}_i = \frac{1}{K} \sum_{l=0}^{K-1} y_{i+l} y_{i+l}^H. \tag{67}$$

It follows that $$\hat{R}_{i+1} = \hat{R}_i + \frac{1}{K} E_i D E_i^H. \tag{68}$$

where $$E_i \equiv [y_i, y_{i+K}] \tag{69}$$

$$D \equiv \begin{bmatrix} -1 & 0 \\ 0 & 1 \end{bmatrix}. \tag{70}$$

Using a conventional matrix inversion lemma (see, for example, M. H. Hayes, Statistical Digital Signal Processing and Modeling, John Wiley & Sons, Inc., New York, N.Y., 1996), it follows from (68) that $$P_{i+1} = P_i - P_i E_i [KD + E_i^H P_i E_i]^{-1} E_i^H P_i. \tag{71}$$

Note that the sandwiched matrix being inverted in (71) is only of size 2×2, which poses no computational issue. Unlike other recursive forms that involve such parameters as the forgetting factor or the step size, the recursive form (71) is stable and has a good tracking capability. As the recursion progresses, old data samples at the back edge are pushed out of, and new the ones before the front edge are pushed into, the observation window, resulting in a continuous update operation. The window length K is the only parameter to be tuned, to which the algorithm is not highly sensitive. On the other hand, algorithms with forgetting factor or step size parameters are very sensitive to such parameters. The swRLS FIR LMMSE equalizer is summarized in Table II.

TABLE II

Summary of swRLS FIR LMMSE equalizer

Initialize $P_0 = R_0^{-1}$
For $i = 0, 1, \ldots,$ compute
$G_i = R_{xy}(i) P_i$, with $R_{xy}(i)$ constructed by (62)
$x_i = G_i y_i$, with $y_i$ constructed by (52)
$P_{i+1} = P_i - P_i E_i [KD + E_i P_i E_i^H]^{-1} E_i^H P_i$, with $E_i$ constructed by (69)

The chip-level MIMO state-space model is now described.

In this section, the state-space model for the MIMO CKF is developed. The CKF updates the state estimate at each chip epoch. Specifically, at the ith chip interval, the BLUE of $\{x^t(i): t=1, \ldots, M\}$ is sought based on all past observations $\{y_r(k): k \leq i, r=1, \ldots, N\}$. The observation vector at chip time i is defined by (53), which can be expressed as $$y(i) = H(i) x(i) + v(i) \tag{72}$$

where H(i) is defined in (65), x(i) in (45) and v(i) in (32). As before, the measurement noise v(i) is assumed to have zero mean and autocorrelation matrix given by (38). The state dynamics is described by $$x(i) = Ax(i-1) + w(i) \tag{73}$$

where $$A = I_M \otimes \tilde{A} \tag{74}$$

$$w(i) = [w_1^T(i), \ldots, w_M^T(i)]^T \tag{75}$$

$$\tilde{A} = \begin{bmatrix} 0_{1 \times D} & 0 \\ I_D & 0_{D \times 1} \end{bmatrix} \tag{76}$$

$$w_t(i) = [x^t(i), 0, \ldots, 0]^T : (D+1) \times 1 \tag{77}$$

for $t=1, \ldots, M$. Here, the notation $\otimes$ denotes the Kronecker product. With assumption (61), the autocorrelation of the state noise in (75) is given by $$Q_w(i) \equiv E[w(i) w^H(i)] = \begin{bmatrix} Q_{(1)} & & 0 \\ & \ddots & \\ 0 & & Q_{(M)} \end{bmatrix} \tag{78}$$

$$Q_{(t)} = \text{diag}(\sigma_t^2, 0, \ldots, 0) : (D+1) \times (D+1). \tag{79}$$

for $t=1, \ldots, M$, where $\sigma_t^2$ is as defined blow eq. (61).

The symbol-level MIMO state-space model is described next.

For completeness and performance comparison purposes, in this section the symbol-level state-space model for MIMO links is developed. In this model, the time index is the symbol index. At time n, the SKF operating under this model seeks the BLUE of $\{[x^t(nF+F-1), \ldots, x^t(nF)]: t=1, \ldots, M\}$ based on all past observations $\{y_r(k): k \leq nF+F-1; r=1, \ldots, N\}$. One may define the observation vector at time n as $$y(n) \equiv [y_1^T(n), \ldots, y_N^T(n)]^T \tag{80}$$

$$y_r(n) \equiv [y_r(nF+F-1), \ldots, y_r(nF)]^T. \tag{81}$$

for $r=1, \ldots, N$, where $y_r(i)$ is given by (43). Based on the signal model given above in the discussion of the MOMO signal model, one obtains $$y_r(n) = H_r(n) x(n) + v_r(n) \tag{82}$$

where $$H_r(n) = [H_r^1(n), \ldots, H_r^M(n)] : F \times (D+F)M. \tag{83}$$

$$x(n) = [x^{1T}(n), \ldots, x^{MT}(n)]^T \tag{84}$$

$$H_r^t(n) \equiv \begin{bmatrix} h_{r,0}^t(n) & \cdots & h_{r,D}^t(n) & & 0 \\ & \ddots & & \ddots & \\ 0 & & h_{r,0}^t(n) & \cdots & h_{r,D}^t(n) \end{bmatrix} : F \times (D+F) \tag{85}$$

$$x^t(n) \equiv [x^t(nF+F-1), \ldots, x^t(nF-D)]^T \tag{86}$$

$$v_r(n) \sim \text{i.i.d.} \, CN(0, \sigma_v^2 I_F). \tag{87}$$

In (85) it has been assumed, for notional simplicity, that the channel is constant over each symbol period. The measurement equation can now be written as $$y(n) = H(n) x(n) + v(n) \tag{88}$$

where $$H(n) \equiv [H_1^T(n), \ldots, H_N^T(n)]^T \tag{89}$$

$$v(n) \equiv [v_1^T(n), \ldots, v_N^T(n)]^T \sim \text{i.i.d.} \, CN(0, \sigma_v^2 I_{NF}) \tag{90}$$

The state dynamics is described by $$x(n) = Ax(n-1) + w(n) \tag{91}$$

where $$A \equiv I_M \otimes \tilde{A} \quad (92)$$

$$w(n) \equiv [w_1^T(n), \ldots, w_M^T(n)]^T \quad (93)$$

$$\tilde{A} = \begin{bmatrix} 0_{F \times D} & 0_{F \times F} \\ I_D & 0_{D \times F} \end{bmatrix} \quad (94)$$

$$w_t(n) = [x^t(nF+F-1), \ldots, x^t(nF), 0, \ldots, 0]^T : (F+D) \times 1. \quad (95)$$

in place of $R_{ss}$ in (18), where $\sigma^2$ is the total power of each transmit antenna. For convenience, it has been assumed in (96) and (98) that each Walsh code user divides its power equally among all transmit antennas.

A discussion is now made of complexity and a reduced-complexity Kalman filter.

A complexity analysis is now undertaken.

Table III summarizes the complexity of five algorithms for SISO systems. Here, the recursive FIR algorithm is one that updates the observed autocorrelation matrix according to $$R_{yy}(t+1) = \lambda R_{yy}(t) + (1-\lambda) y(t+1) y^H(t+1) \quad (99)$$

TABLE III

Per-chip complexity for SISO links with M = N = 1, f = complexity reduction factor

| Algorithm | Parameter | Complex multiplications | Complex additions |
|---|---|---|---|
| CKF | p = D + 1 | $O\left(\frac{3p^2/2 + 2p}{f} + 2p\right)$ | $O(3p^2/2f + 2p)$ |
| SKF | p = D + F | $O\left(\frac{3p^2/2 + 2Fp + F^2}{f} + 2p\right)$ | $O\left(\frac{2p^2 + 2Fp + F^2}{f} + 2p\right)$ |
| Recursive FIR | p = L + 1 | $O(2p^2 + 3p)$ | $O(3p^2/2)$ |
| swRLS FIR | p = L + 1 | $O(2p^2 + 8p + Dp)$ | $O(3p^2 + 5p)$ |
| Block LMMSE | p = L + 1 | $O\left(\frac{p^3 + p^2}{K} + 2p\right)$ | $O\left(\frac{p^3 + 2p^2}{K} + 2p\right)$ |

TABLE IV

Per-chip complexity for MIMO links. f = complexity reduction factor

| Algorithm | Parameter | Complex multiplications | Complex additions |
|---|---|---|---|
| CKF | p = (D + 1)M | $O\left(\frac{2Np^2 + 2N^2p}{f} + 2Np\right)$ | $O\left(\frac{2Np^2 + N^2p - p^2/2}{f} + 2Np\right)$ |
| swRLS FIR | p = (L + 1)N | $O(4p^2 + 8p + MNDp)$ | $O(7p^2/2 + 4p + Mp + MNp)$ |
| Block LMMSE | p = (L + 1)N | $O\left(\frac{p^3 + MNDp}{K} + 2MNL\right)$ | $O\left(\frac{p^3 + MNDp}{K} + Mp + N^2L\right)$ |

With the assumption that data streams transmitted via different antennas are uncorrelated, the autocorrelation matrix of the state noise process defined by (93) is given by $$Q_w(n) = I_M \otimes Q(n) \quad (96)$$

$$Q(n) = \begin{bmatrix} \tilde{Q}_w(n) & 0_{F \times D} \\ 0_{D \times F} & 0_{D \times D} \end{bmatrix} \quad (97)$$

where the matrix $\tilde{Q}_w(n)$ is given by (18) together with (19). An approximate version of (96) can be obtained by using $$\hat{R}_{ss} = \sigma^2 I_F \quad (98)$$

TABLE V

Per-chip complexity values for SISO with F = 32, D = 5, L = 15, K = 256

| Algorithm | CMs** | CAs*** |
|---|---|---|
| CKF (f = 240/5) | O(14) | O(14) |
| SKF (f = 1) | O(5520) | O(6204) |
| Recursive FIR | O(560) | O(384) |
| swRLS FIR | O(1232) | O(848) |
| Block LMMSE | O(50) | O(50) |

TABLE VI

Per-chip complexity values for MIMO with
M = N = 2, F = 32, D = 5, L = 15, K = 256

| Algorithm | CMs | CAs |
| --- | --- | --- |
| CKF (f = 240/5) | O(62) | O(60) |
| swRLS FIR | O(5000) | O(3900) |
| Block LMMSE | O(250) | O(255) |

**Complex multiplications.
***Complex additions.

from which a recursive inverse autocorrelation matrix is obtained. Meanwhile, the block FIR LMMSE computes the observed autocorrelation matrix according to (66), which requires one matrix inversion per block. Note that the parameter p for the FIR filtering methods is different from that for the Kalman filtering methods. Specifically, p=D+1 for the CKF and p=L+1 for the block FIR; the importance here is that the FIR equalizer order always needs to be several times greater than the channel order, i.e., L>>D. The swRLS algorithm has a slightly higher complexity than the recursive FIR filter. The complexity reduction factor f for the Kalman filter will be defined below.

Table IV summarizes the complexity analysis of three algorithms for MIMO systems. Depending on the values of f and K, the CKF and the block FIR LMMSE filter have similar complexities. Unlike the SISO case, where the number of computations required by the matrix inversion can be reduced to $O(p^2)$ by taking advantage of the Toeplitz structure of the autocorrelation matrix, the Toeplitz structure does not exist in the MIMO case. Therefore, for moderate K, the complexity of the block FIR LMMSE filter is dominated by the cubic term $p^3$ due to direct matrix inversion every block. This complexity can be reduced by increasing the block length K. Unfortunately, K is upper limited by the coherence time of the channel, which implies that in fast fading environments the CKF tends to be a better choice than the other methods. Typical complexity values are listed in Tables V and VI for the Vehicle-A channel model.

The reduced-complexity Kalman filter is now described.

It may appear that the CKF is not less expensive than the block FIR LMMSE equalizer if the block length K can be made large (in slow fading environments). However, like the block FIR LMMSE equalizer, the CKF can also take advantage of slow fading to reduce its complexity. In fact, it is a well-known property that for stationary processes, the Kalman filter converges to the optimal causal IIR Wiener filter. In such a case, the prediction error covariance matrix P(k|k−1), the Kalman gain K(k) and the filtering error covariance matrix P(k|k) each converges to a steady state value.

Consider the state-space model $$x(k)=Ax(k-1)+w(k) \qquad (100)$$

$$y(k)=Hx(k)+v(k) \qquad (101)$$

where it has been assumed that the channel stays relatively constant over a long duration, i.e., H(k)=H. To ensure system stability, assume that all the eigenvalues of A lie inside the unit circle (stability is discussed in the next section.) Also assume a stationary transmitted signal and stationary observation noise such that $Q_w(k)=Q_w$, which holds relatively well for normally to highly loaded CDMA signals, and $Q_v(k)=\sigma_v^2 I$. Then, given a positive semidefinite $P(k_o|k_o-1)$ for some $k_o$, as $k \to \infty$, P(k|k−1) converges to the steady-state value P that satisfies the Riccati equation $$P=A[P-PH^H(HPH^H+Q_v)^{-1}HP]A^H+Q_w. \qquad (102)$$

Figure 1:
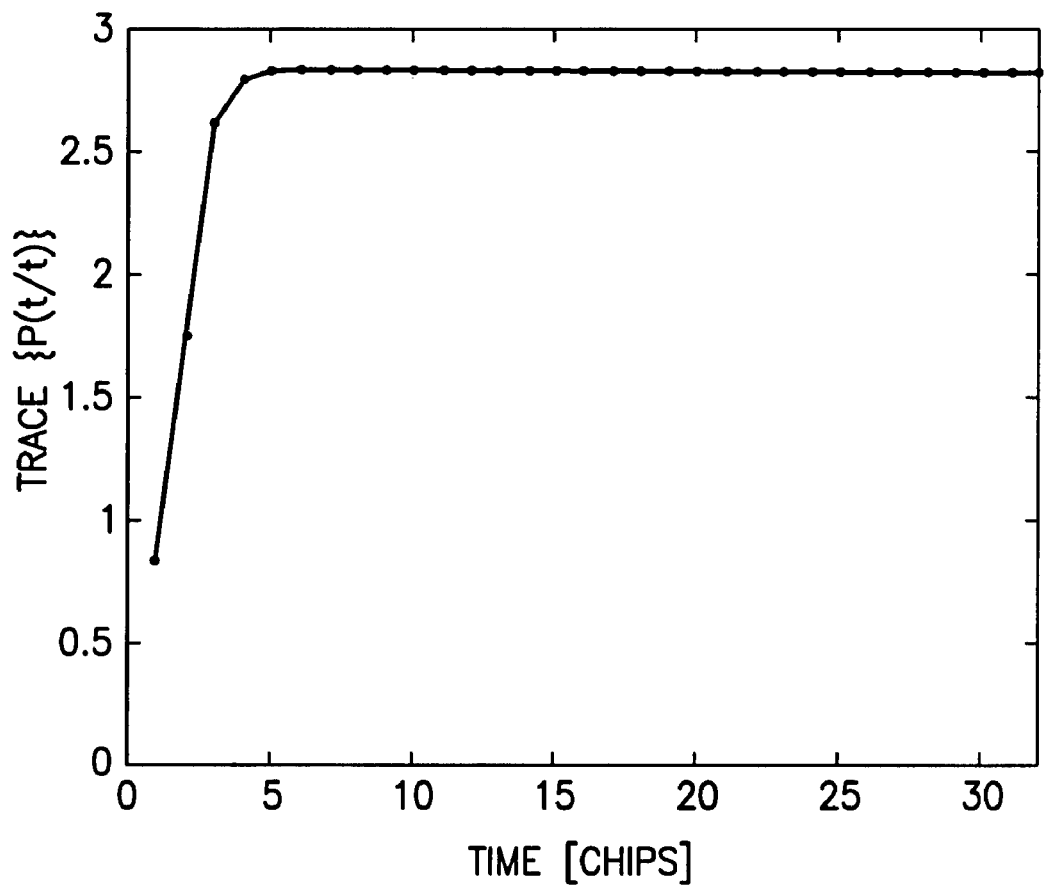
FIG. 1 is a graph showing the convergence of the state error variance in a SISO system with M=1, N=1, Veh-A at v=50 km/h, U=25, SF#118.

Therefore, P(k|k) and K(k) also converge to their steady state values. In practice, it takes only a small number of steps for the Kalman gain and the error covariance matrices to converge. FIG. 1 shows an example where the convergence time is only about 5 to 6 chip periods.

To reduce the complexity of the Kalman filter, let $l_s$ denote the number of consecutive time steps over which the state-space model can be considered stationary. Let $l_t$ denote the settling time (the number of steps it takes for the Kalman filter to converge). Since $l_s$, which is on the order of the coherence time of the channel, is generally large and $l_t$ is generally small, we have that $l_t << l_s$. Then, in each window of $l_s$ time steps, P(k|k−1), K(k), and P(k|k) need to be updated only during the first $l_t$ steps. In other words, the operation to update these variables can be turned on and off periodically. The resulting reduced complexity recursion is summarized in Table VII. One can see that the complexity of the update routine for P(k|k−1), K(k), and P(k|k) is reduced by the factor $$f=l_s/l_t. \qquad (103)$$

TABLE VII

Reduced complexity Kalman filter

Initialize $P^+ = P(0|0)$.
For k =1,2, ... , compute
  x(k|k − 1) = Ax(k − 1|k − 1)
  if mod(k,$l_s$) ≤ $l_t$
  {
    $P^- = AP^+ A^H + Q_w$
    $K = P^- H^H [HP^- H^H + Q_v]^{-1}$
    $P^+ = [I - KH]P^-$
  }
  x(k|k) = x(k|k − 1) + K[y(k) − Hx(k|k − 1)]

A discussion is now made of stability and observability.

Stability: One may readily verify that all eigenvalues of the A matrices of the above state-space models lie inside the unit circle in the complex plane. In fact, all the eigenvalues are zero. Therefore, the state equations are asymptotically stable. Moreover, asymptotic stability implies BIBO stability. Thus, the models are stable.

Observability: The observability of a state-space model has a direct effect on the estimability of the state vector at an arbitrary time epoch, given the set of observations over a certain time interval. Estimability in stochastic systems can be thought of as the counterpart of observability in deterministic systems. Generally speaking, if a deterministic state-space model is observable, then the state vector of the corresponding stochastic state-space model is estimable. To show that the state vectors of the state-space models developed above are estimable by means of the Kalman filter, it is now established that the models are observable.

In the observability discussion, the model is considered deterministic, i.e., the noise processes are replaced by deterministic functions. Without loss of generality, the observation noise is set to zero. It thus suffices to consider the model $$x(k)=A(k)x(k-1)+w(k) \qquad (104)$$

$$y(k)=H(k)x(k). \qquad (105)$$

From the definition of observability (see C.-T. Chen, Linear System Theory and Design, Oxford University Press: New York, N.Y., 1999) the state-space model defined by (104) and (105) is observable if and only if for any $k_1$, there exists $k_2 > k_1$ such that the observability matrix $$O(k_1, k_2) = \begin{bmatrix} H(k_1) \\ H(k_1+1)A(k_1+1) \\ \vdots \\ H(k_2) \prod_{k=0}^{k_2-k_1-1} A(k_2-k) \end{bmatrix} \quad (106)$$

has full column rank. If the model is observable, then given the observations $\{y(k): k=k_1, \ldots, k_2\}$ and the knowledge of the driving input $\{w(k): k=k_1, \ldots, k_2\}$ the initial state $x(k_1)$ is uniquely determined. In the models developed herein, the A-matrices are time invariant and, hence, the observability matrix becomes $$O(k_1, k_2) = \begin{bmatrix} H(k_1) \\ H(k_1+1)A \\ \vdots \\ H(k_2)A^{k_2-k_1} \end{bmatrix} \quad (107)$$

For clarity, the discussion is restricted specifically to the SISO case with single receive antenna (N=1); the same conclusion can be drawn for all the other cases. First consider the chip-level SISO model. Assuming that the leading and the tailing channel coefficients are nonzero, i.e., $h_0(i) \neq 0$ and $h_D(i) \neq 0$. (If any of them is zero then the channel can be shortened to make the leading and the tailing coefficients nonzero). It is easy to show that for $k_2 = k_1 + D$ the observability matrix has the anti upper triangular form $$O(k_1, k_1+D) = \begin{bmatrix} h_0(k_1) & \cdots & h_{D-1}(k_1) & h_D(k_1) \\ h_1(k_1+1) & \cdots & h_D(k_1+1) & 0 \\ \vdots & \ddots & \ddots & \vdots \\ h_D(k_1+D) & 0 & \cdots & 0 \end{bmatrix} \quad (108)$$

which has full rank. For the symbol-level case, the interested reader may verify that $O(k_1, k_2)$ has full column rank if $k_2 \geq k_1 + \lceil D/F \rceil$, where $\lceil \cdot \rceil$ denotes the ceiling function.

The error rate performances of the Kalman and the swRLS filters can be simulated using a Matlab simulation chain. The filters are compared in performance with two FIR LMMSE methods, namely the block FIR LMMSE filter, which computes the observed autocorrelation matrix according to (66) and then employs direct matrix inversion, and the recursive FIR LMMSE, which uses the recursive inverse form of (99). The investigation herein uses the 1XEV-DV standard and Table VIII lists the parameters repeatedly used in the simulations.

TABLE VIII

Common simulation settings

| | | | |
|---|---|---|---|
| Standard | 1XEV-DV | Data rate (kb/s) | 163.2 (QPSK) |
| Channel models tested | Veh-A, Veh-B | Data rate (kb/s) | 316.8 (16QAM) |
| Modulation | QPSK, 16QAM | FEC rate (QPSK, 16QAM) | 0.7083/M, 0.5156/M |
| No. of desired Walsh codes | 3 (QPSK) | Pilot power | 10% |
| No. of desired Walsh codes | 4 (16QAM) | User power | 90% |
| Total No. of Walsh codes | U = 25 | User power distribution | Even |
| Spread factor | F = 32 | Channel estimation | Ideal |

SISO Simulations

Figure 2A:
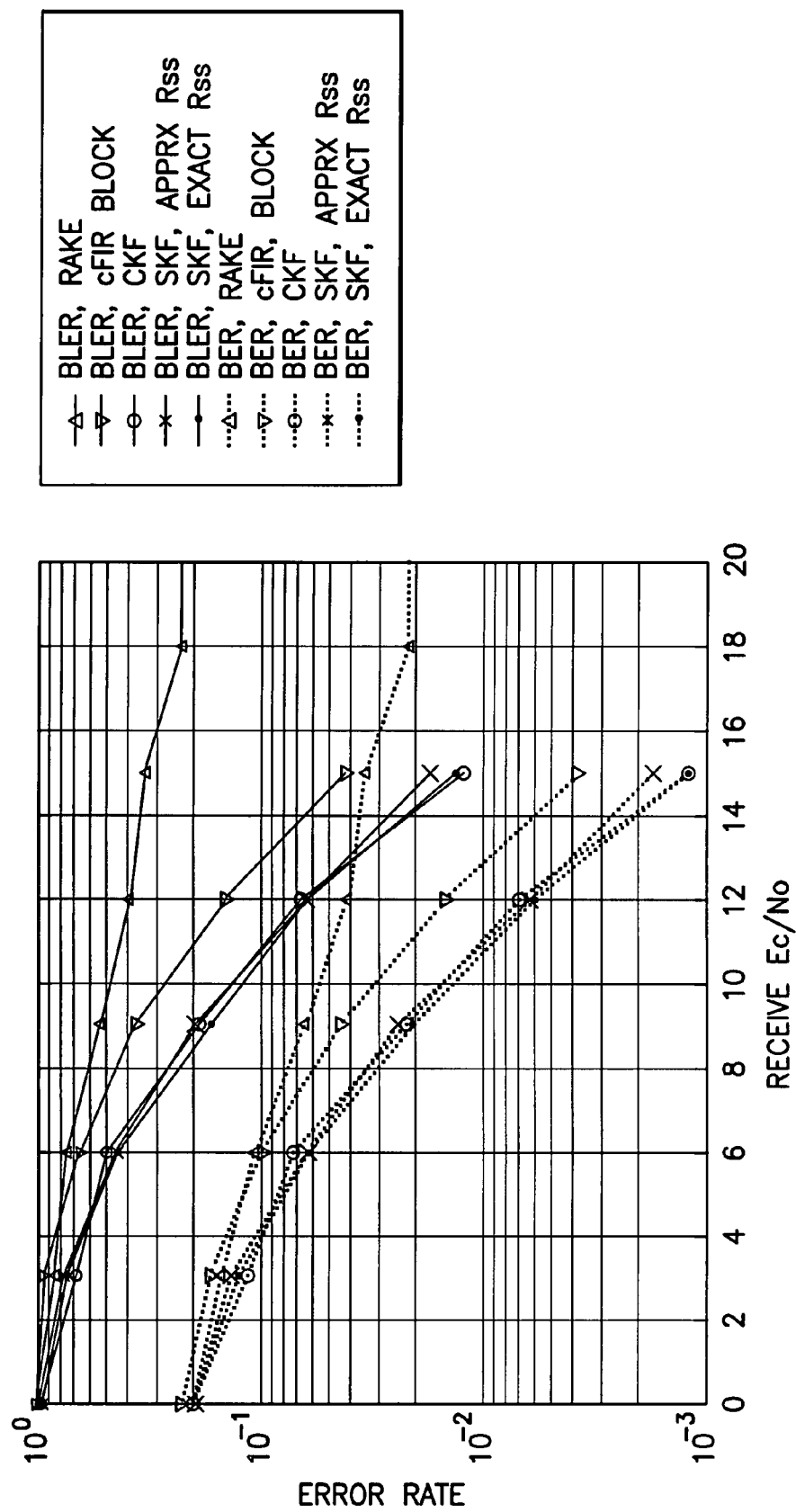
FIG. 2 is a graph showing error performance for a QPSK SISO link with M=1, N=1, U=25, L=15, K=128, δ=7, f=240/5, Veh-A at (a) v=30 km/h, (b) v=50 km/h
Figure 2B:
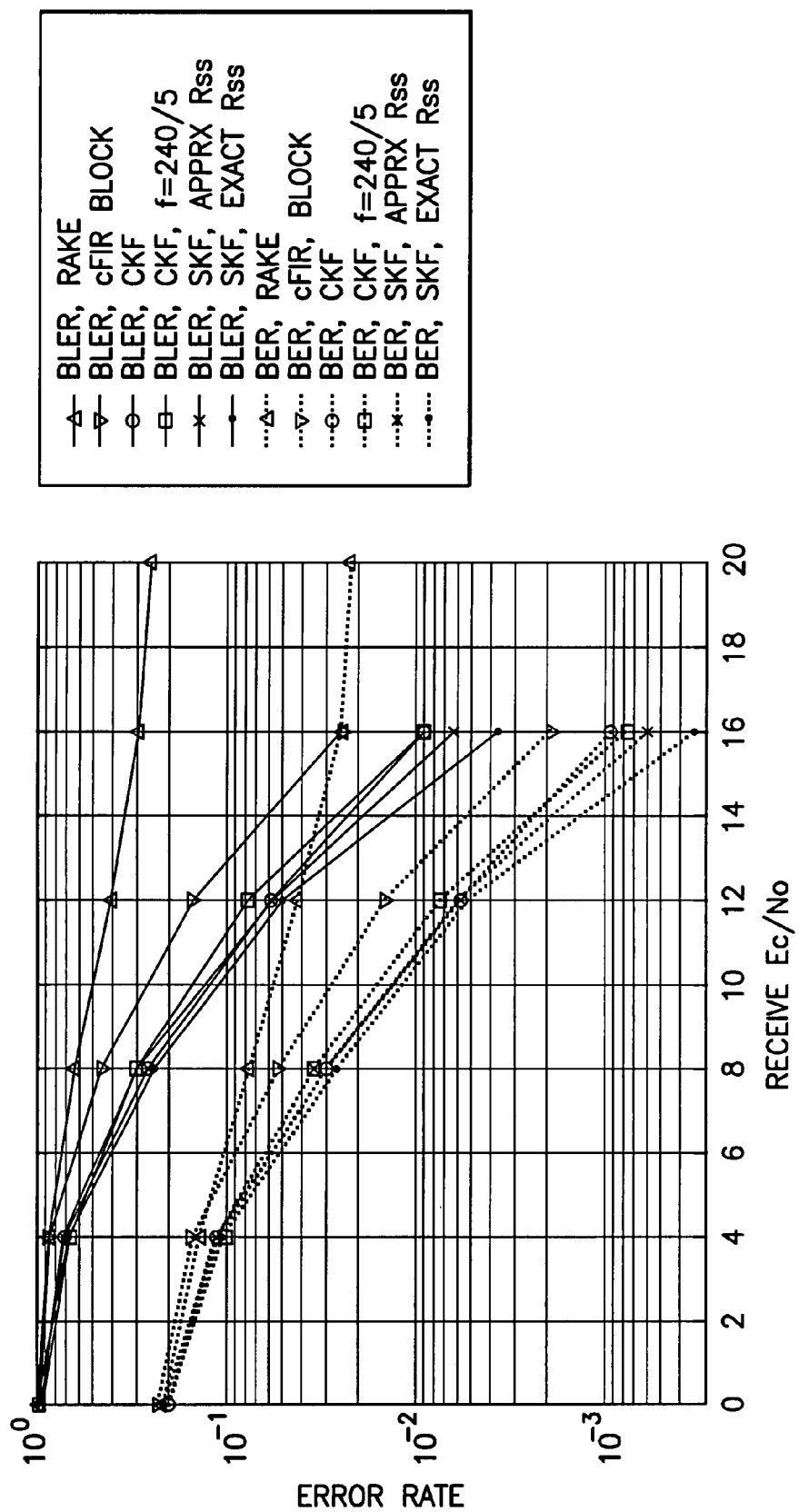
Figure 3:
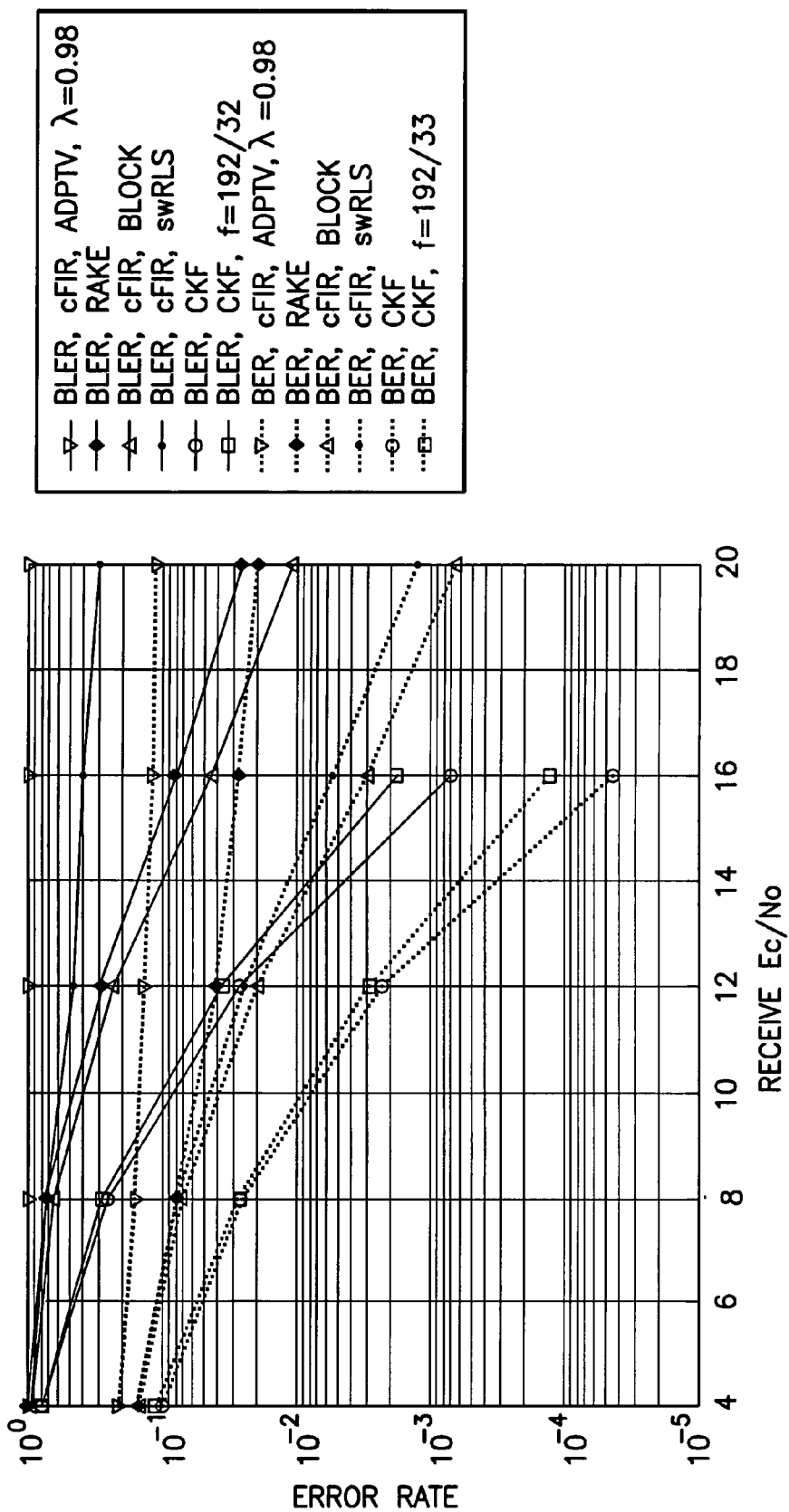
FIG. 3 is a graph showing error performance for a QPSK SISO link with M=1, N=1, U=25, L=33, K=256, δ=16, λ=0.98, f=192/32, Veh-B at v=120 km/h.
Figure 4:
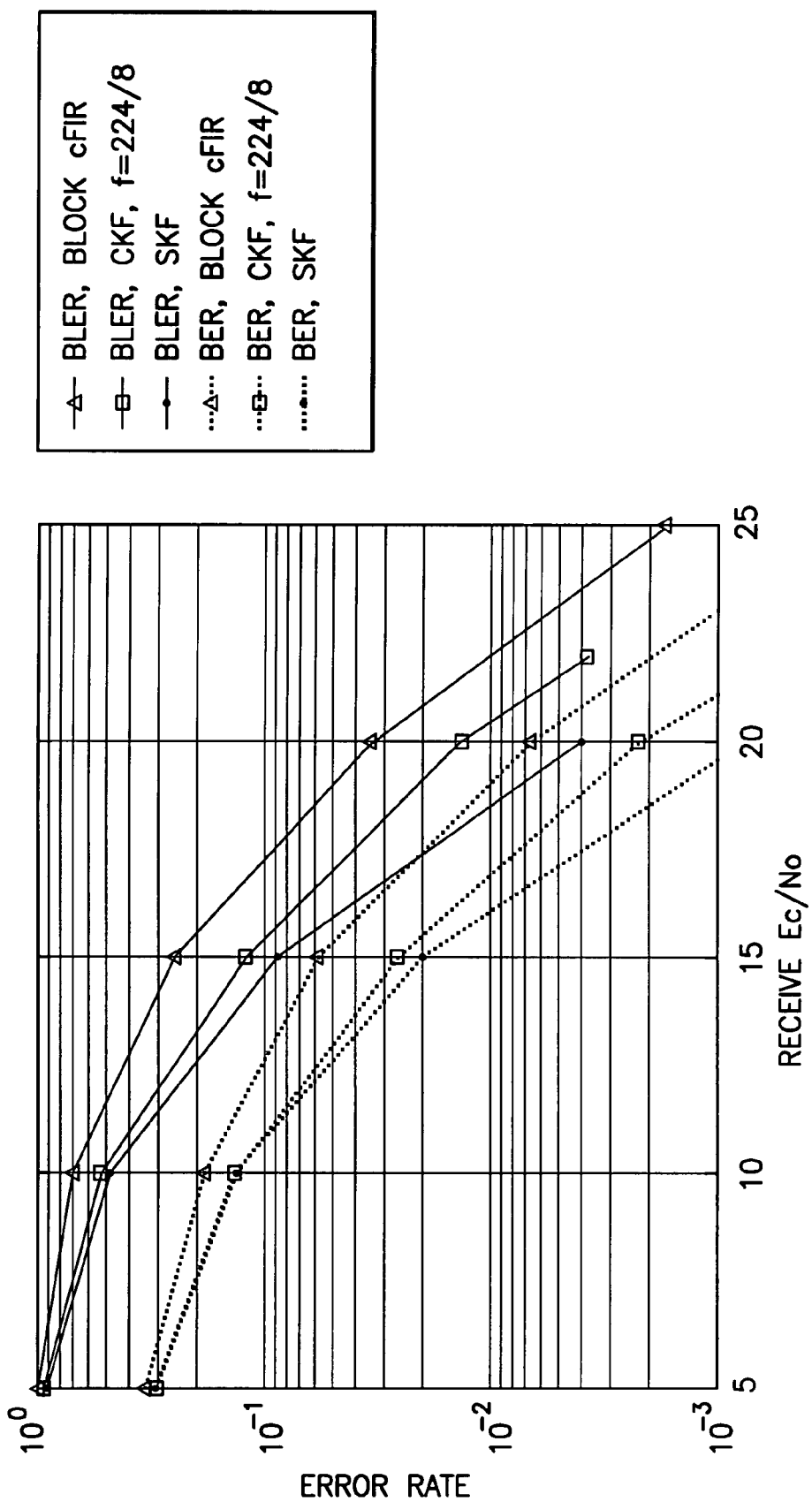
FIG. 4 is a graph showing error performance for a 16QAM SISO link with M=1, N=1, U=25, L=15, K=256, δ=7, f=224/8, Veh-A at v=50 km/h.
Figure 5:
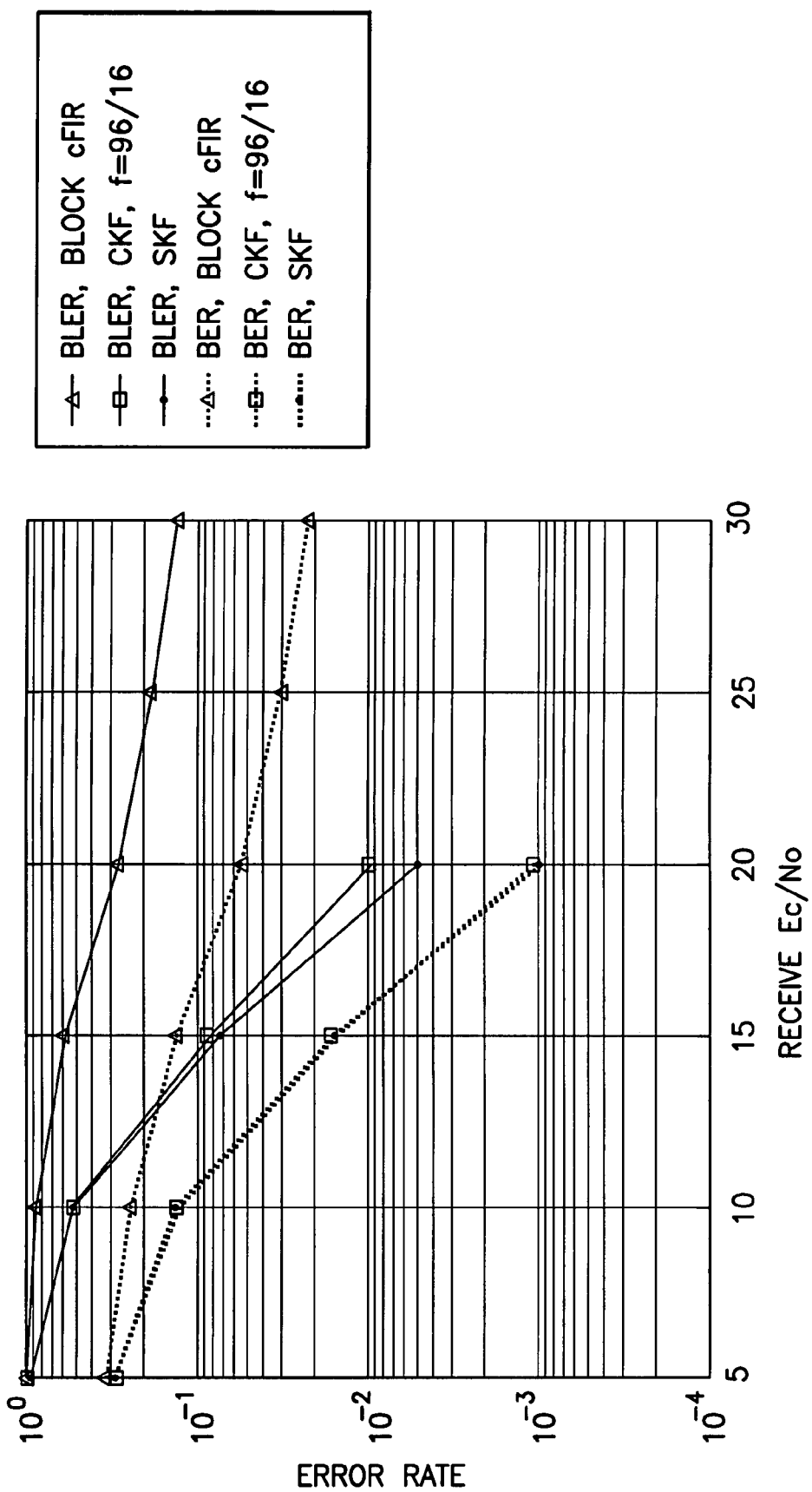
FIG. 5 is a graph showing error performance for 16QAM SISO link with M=1, N=1, U=25, L=41, K=512, δ=20, f=96/16, Veh-B at v=120 km/h.
Figure 6A:
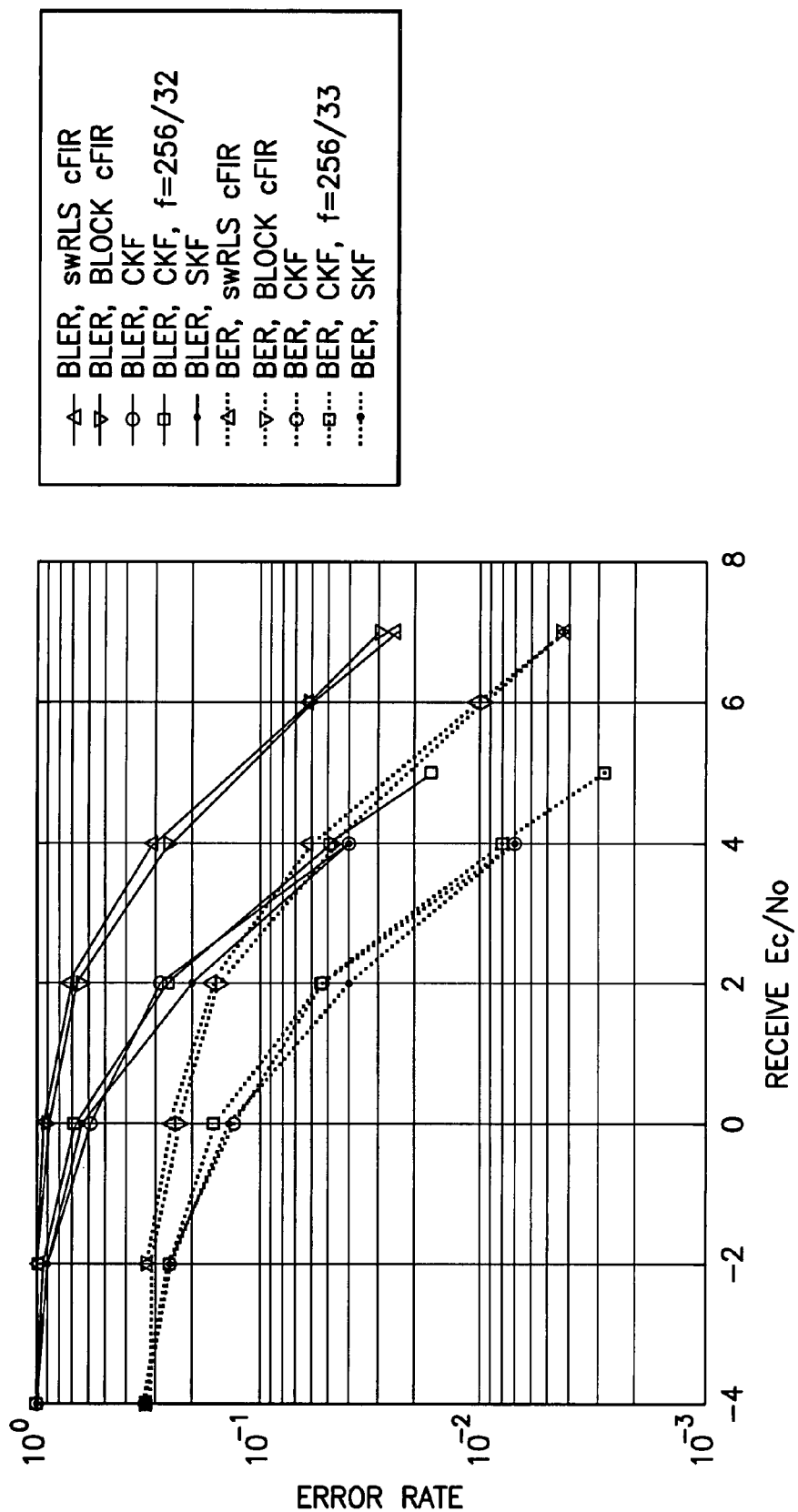
FIG. 6 is a graph showing error performance for a QPSK MIMO link with M=2, N=2, U=25, L=10, K=128, δ=5 Veh-A. (a) v=30 km/h, f=256/32; (b) v=50 km/h, f 240/5
Figure 6B:
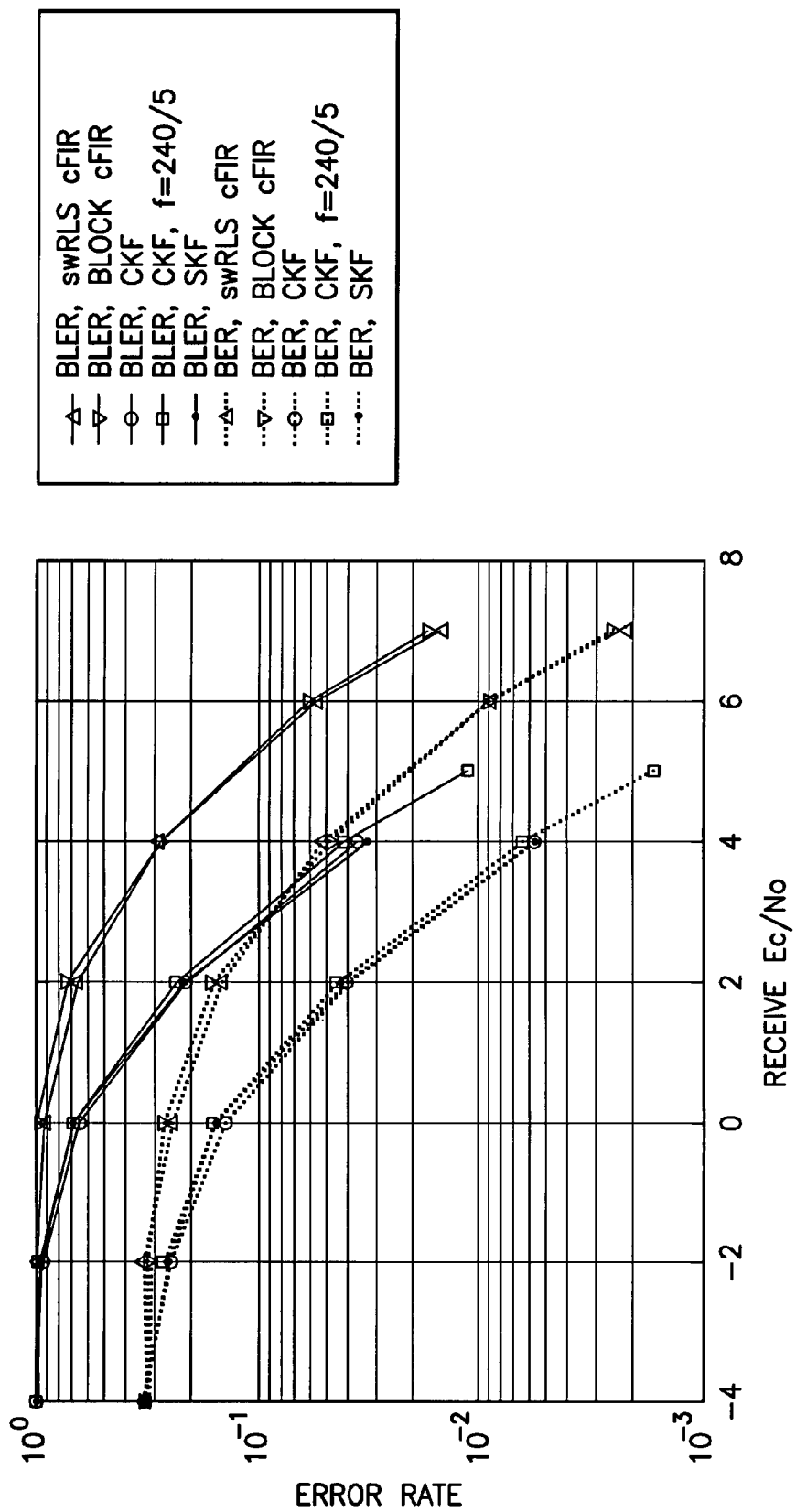
Figure 7A:
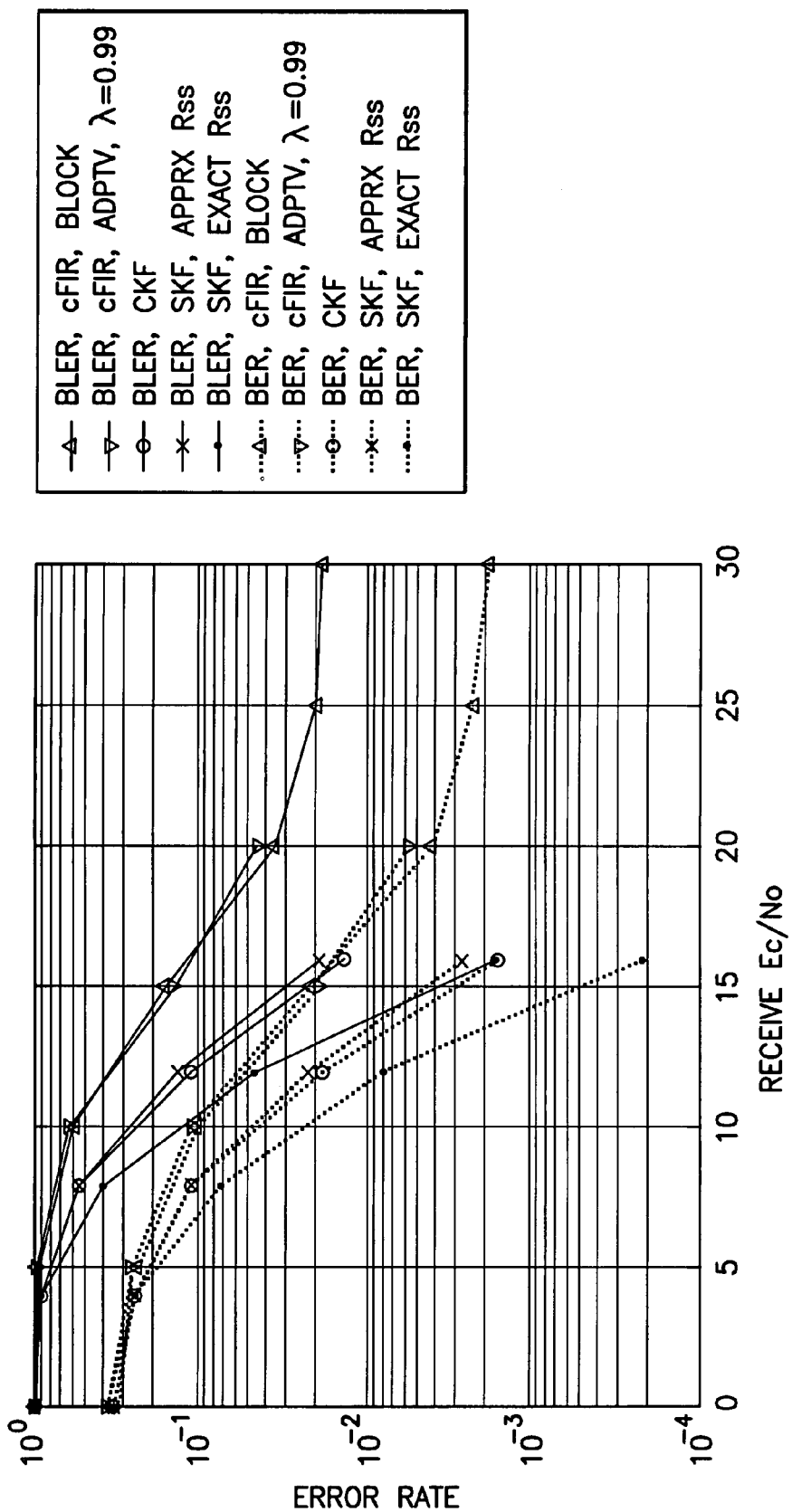
FIG. 7 is a graph showing error performance of a QPSK MIMO link with M=2, N=1, U=25, L=9, K=192, δ=5, λ=0.99, Veh-A at (a) v=30 km/h, (b) v=50 km/h.
Figure 7B:
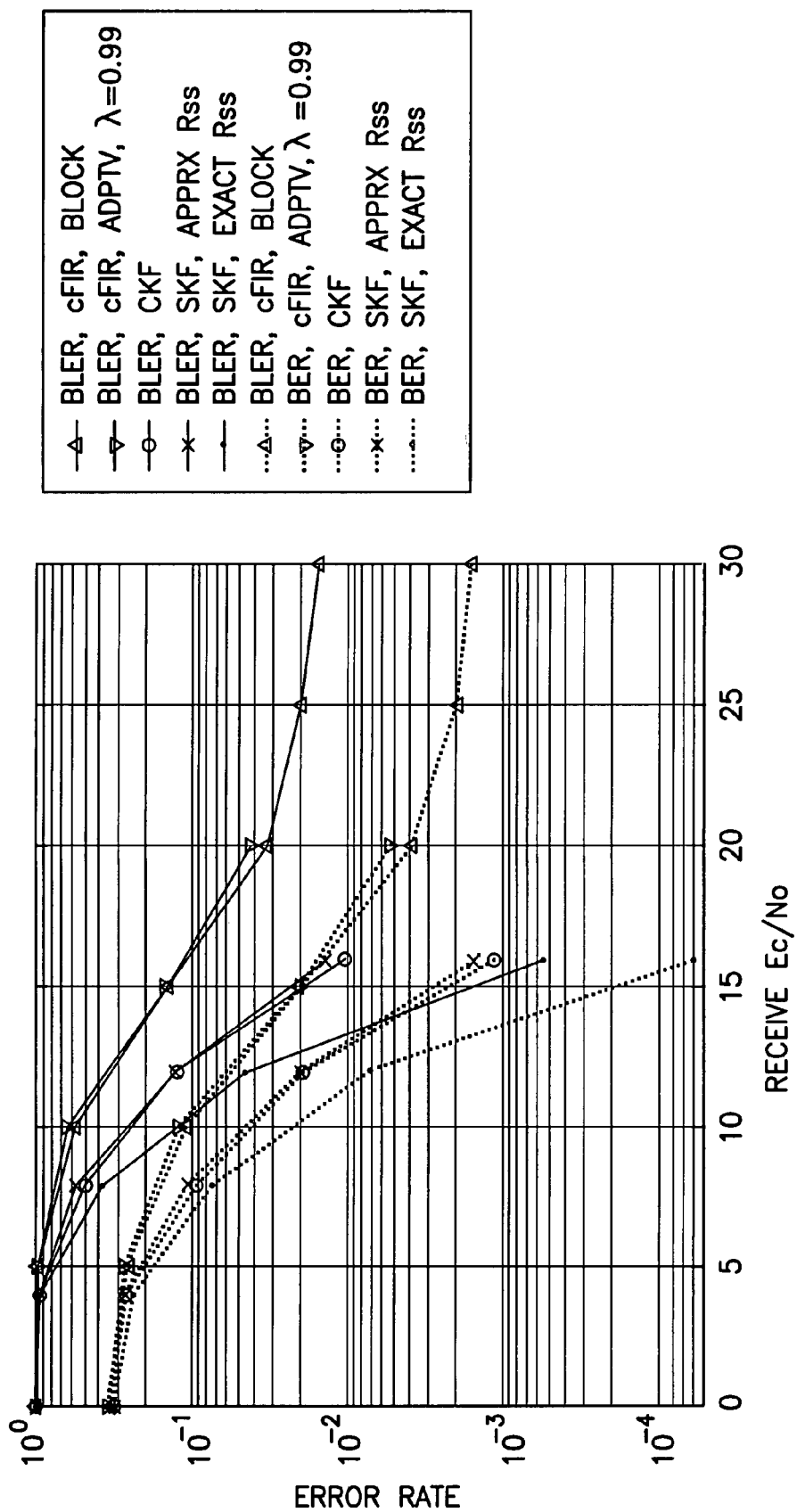

Simulation results for SISO systems are shown in FIGS. 6 and 7 for QPSK and in FIGS. 4 and 5 for 16QAM. It is interesting to see from FIG. 2 that the CKF and the SKF have comparable performances and are about 2 dB better than the FIR filters. Furthermore, the SKF exhibits no appreciable performance loss when the code correlation matrix $R_{ss}$ matrix in (19) is replaced by approximation (23). In FIGS. 3 and 5 the simulation is performed at a high vehicle speed (v=120 km/h); the CKF in this case has a substantial performance gain over the FIR LMMSE filter-based methods. The performance of the reduced-complexity CKF is shown in FIG. 2(b), where f=240/5 resulting in a degradation of about 0.5 dB; and in FIG. 3, where f=192/32 which degrades the performance by about 0.2 dB.

MIMO Simulations

Figure 8:
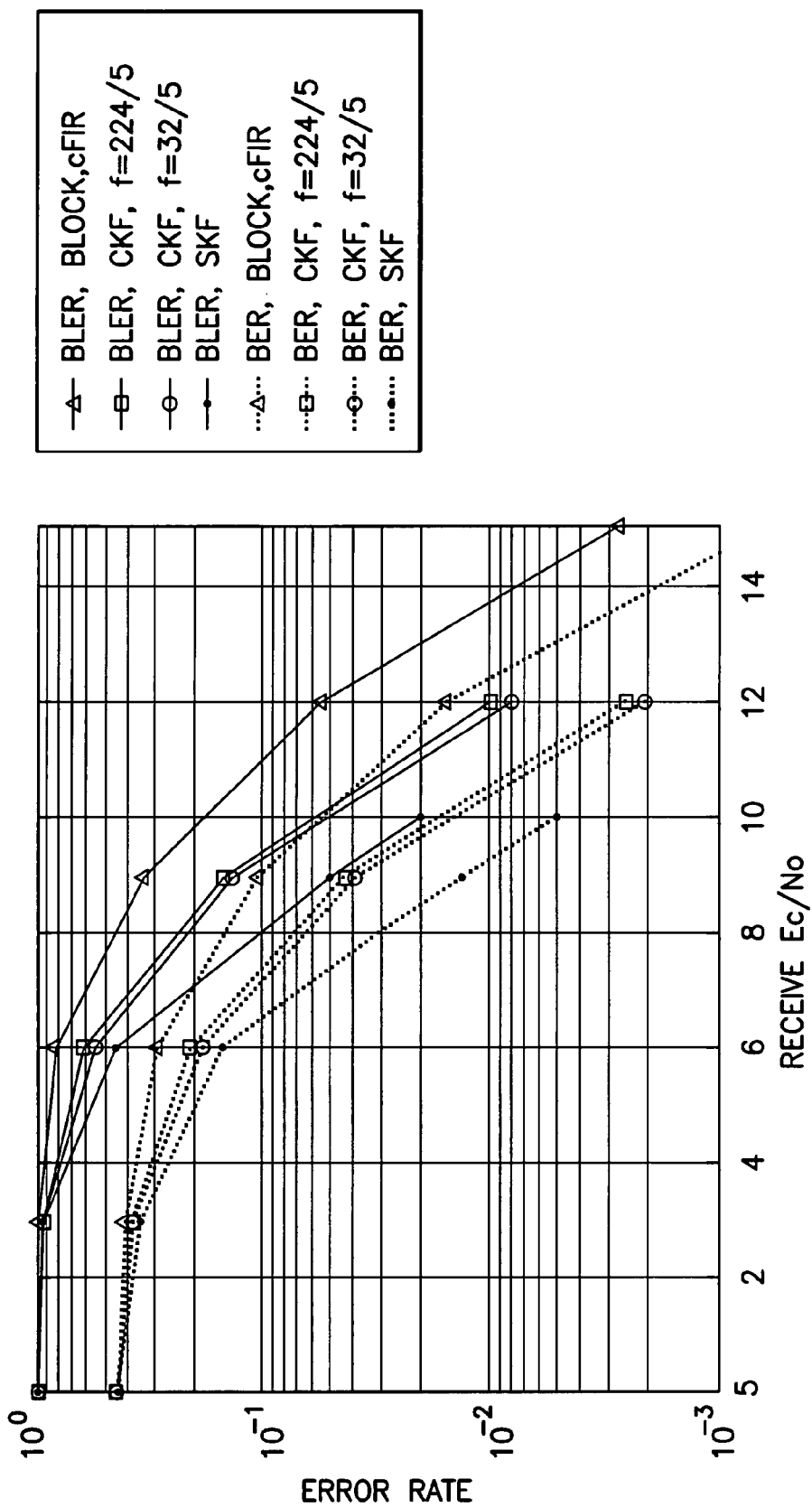
FIG. 8 is a graph showing error performance for a 16QAM MIMO link with M=2, N=2, U=25, L=10, K=192, δ=5, Veh-A at v=50 km/h.

Simulation results for MIMO systems are shown in FIGS. 6 and 7 for QPSK and in FIG. 8 for 16QAM. It may be seen here again that the SKF and the CKF perform comparably. Also, the swRLS and the block FIR LMMSE filters are virtually identical in performance.

The results in FIG. 7 are for a MISO system with two transmit antennas and one receive antenna. In this scenario, the FIR LMMSE methods exhibit a noise floor at a BLER slightly above $10^{-2}$, while the Kalman filter-based methods show no noise floor in the given BLER range. Comparing FIGS. 2 and 7 reveals that, with one receive antenna, no diversity gain is seen when the number of transmit antennas is increased from one to two, even though in doing so the effective turbo code rate is reduced by a factor of two for MIMO transmission (the total transmit power unchanged). On the other hand, the diversity gain is significant when two receive antennas are used instead of one, as indicated by FIGS. 6 and 7.

Note, in particular, from FIG. 6(b) that a complexity reduction factor of f=240/5 results in virtually no performance loss for the CKF. In FIG. 6(a), the performance loss is almost unnoticeable for f=256/32, indicating that the reduction factor could be increased to a higher value such as the one in FIG. 6(b).

By way of review, in this patent application the inventors have developed symbol-level and chip-level state-space models for downlink CDMA channels. The Kalnan filter 14B, 24B shown in FIGS. 9B and 10B is employed to estimate the transmitted downlink signal in order to restored the user codes' orthogonality, thereby arriving at an efficient single-user detection method for each state-space model. The results of simulations have been provided to illustrate that the Kalman filter outperforms the FIR LMMSE filters by about 1.5-2 dB. Greater gains are seen at high mobile speeds (e.g., 120 km/h).

While the FIR LMMSE filter can take advantage of slow fading to reduce the computational complexity, the KF can do likewise by periodically skipping the update of the Kalman gain and the error covariance matrices, thanks to its fast convergence behavior. Such a scheme results in a reduced-complexity KF that exhibits negligible loss in performance for reasonable reduction factors.

Unlike the conventional FIR LMMSE methods which yield biased signal estimates, the KF has been shown to be a minimum-variance unbiased estimator. This is an advantageous feature that eliminates the need to offset the bias prior to performing soft demodulation.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As a first example, in the foregoing description an assumption has been made that the channel estimate information H is available. In practice, however, the channel is estimated from the pilot signals contained in the downlink signals and is subject to an estimation error due to multiple access interference. The channel estimate can, however, be improved by feeding the soft signal estimate at the output of the KF back to the channel estimator and combining it with the pilot signals, thereby giving rise to a stronger effective pilot signal. This (optional) feedback path (FBP) is shown in FIGS. 9B and 10B as a dashed line. The soft feedback thus accounts for all traffic interference. On the other hand, hard decision feedback from the output of the demodulator is also possible, which, however, accounts only for the desired user traffic.

As another example, it should also be noted that an embodiment of the Kalman filter may be realized in the square-root form. The square-root Kalman filter performs better at keeping the error covariance matrices nonnegative definite, and enhances the matrix condition number and, hence, has an improved numerical stability.

As another example, it is also with the scope of this invention to estimate the current state x(k) based on the observations $\{y(l): 1 \leq k+L\}$, with L>0. That is, the observations contain L samples into the future. This estimate can be obtained by employing a fixed-lag Kalman smoother. However, the Kalman smoother requires a higher computational power than the Kalman filter. As such, a reduced complexity Kalman smoother may be preferred for this particular embodiment.

Further, it should be noted that the error covariance matrix P(k|k) contains useful information. Since the diagonal elements of the matrix are a reliability measure for the chip estimates and, hence, the symbol estimates, incorporating this information into the soft demodulator/decoder 15D, 25D may be used to further improve the bit error performance. In the 16QAM simulations of the SISO CKF, the soft demodulated bits (centered at ±1) associated with the nth symbol estimate are scaled by $1/s_n$ prior to decoding, where $s_n$ is the symbol error variance obtained from the output of the CKF. However, all such and similar modifications of and adaptations to the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method comprising:
   receiving a downlink signal from a downlink code-division multiple access CDMA channel;
   applying the received downlink signal to an equalizer that operates in accordance with a Kalman filter for generating a best linear unbiased estimate of a transmitted chip sequence for a single user; and
   receiving the downlink signal by a channel estimator and providing a channel estimate from the channel estimator to the Kalman filter.

2. A method as in claim 1, where $l_s$ denotes a number of consecutive time steps over which a state-space model can be considered stationary, where $l_r$ denotes the settling time as a number of steps required for the Kalman filter to converge, where $l_s$ is on the order of the coherence time of the channel such that $l_r << l_s$, further comprising, in each window of $l_s$ time steps, updating a Kalman filter prediction error covariance matrix P(k|k−1), a Kalman filter filtering error covariance matrix P(k|k) and the Kalman gain K(k) only during the first $l_r$ steps for reducing the computational complexity of the Kalman filter.

3. A method as in claim 1, where the downlink is implemented using a single input single output SISO system with quadrature phase shift key QPSK modulation.

4. A method as in claim 1, where the downlink is implemented using a single input single output SISO system with quadrature amplitude modulation QAM.

5. A method as in claim 1, where the downlink is implemented using a multiple input multiple output MIMO system with quadrature phase shift key QPSK modulation.

6. A method as in claim 1, where the downlink is implemented using a multiple input multiple output MIMO system with quadrature amplitude modulation QAM.

7. A method as in claim 1, further comprising estimating the downlink channel using at least one downlink pilot signal, and feeding-back an output from the Kalman filter to the channel estimation to obtain a stronger effective pilot signal.

8. A method as in claim 1, further comprising providing chip reliability estimates from a filtering error covariance matrix P(k|k) of the Kalman filter to a soft demodulator and decoder.

9. A method as in claim 1, further comprising estimating a current channel state x(k) using L future samples obtained from a fixed-lag Kalman smoother.

10. A method as in claim 1, where the Kalman filter comprises a square root Kalman filter.

11. A method as in claim 1, where the downlink is implemented using a symbol-level single input single output SISO system, where a state-space model of the downlink CDMA channel yields a measurement equation of $$y(n)=H(n)x(n)+\tilde{y}(n)+v(n),$$

where, for a symbol index of n, H represents a channel estimate, x represents the transmitted signal, $\tilde{y}$ represents the channel response due to known pilot signals and v represents a measurement noise process;
and where state dynamics are described by $$x(n)=A(n)x(n-1)+w(n),$$

where A represents the signal amplitude and w represents a state noise process.

12. A method as in claim 1, where the downlink is implemented using a chip-level single input single output SISO system, where a state-space model of the downlink CDMA channel yields a measurement equation of $$y(i)=H(i)x(i)+\tilde{y}(i)+v(i),$$

where, for a chip index of i, H represents a channel estimate, x represents the transmitted signal, $\tilde{y}$ represents the channel response due to known pilot signals and v represents a measurement noise process;
and where state dynamics are described by $$x(i)=A(i)x(i-1)+w(i),$$

where A represents the signal amplitude and w represents a state noise process.

13. A method as in claim 1, where the downlink is implemented using a symbol-level multiple input multiple output MIMO system, where a state-space model of the downlink CDMA channel yields a measurement equation of $$y(n)=H(n)x(n)+v(n),$$

where, for a symbol index of n, H represents a channel estimate, x represents the transmitted signal and v represents a measurement noise process;
and where state dynamics are described by $$x(n)=Ax(n-1)+w(n),$$

where A represents the signal amplitude and w represents a state noise process.

14. A method as in claim 1, where the downlink is implemented using a chip-level multiple input multiple output MIMO system, where a state-space model of the downlink CDMA channel yields a measurement equation of $$y(i)=H(i)x(i)+v(i),$$

where, for a chip index of i, H represents a channel estimate, x represents the transmitted signal and v represents a measurement noise process;
and where state dynamics are described by $$x(i)=Ax(i-1)+w(i),$$

where A represents the signal amplitude and w represents a state noise process.

15. An apparatus comprising:
a Kalman filter having an input configured to receive a signal and configured to generate a best linear unbiased estimate of a transmitted chip sequence for a single user; and
a channel estimator configured to receive the received signal from a downlink code division multiple access channel as an input and configured to provide a channel estimate as an input to the Kalman filter.

16. An apparatus as in claim 15, where $l_s$ denotes a number of consecutive time steps over which a state-space model can be considered stationary, where $l_t$ denotes the settling time as a number of steps required for the Kalman filter to converge, where $l_s$ is on the order of the coherence time of the channel such that $l_t \ll l_s$, further comprising, in each window of $l_s$ time steps, means for updating a Kalman filter prediction error covariance matrix $P(k|k-1)$, a Kalman filter filtering error covariance matrix $P(k|k)$ and the Kalman gain $K(k)$ only during the first $l_t$ steps for reducing the computational complexity of the Kalman filter.

17. An apparatus as in claim 15, where the downlink is implemented using a single input single output SISO system with quadrature phase shift key QPSK modulation.

18. An apparatus as in claim 15, where the downlink is implemented using a single input single output SISO system with quadrature amplitude modulation QAM.

19. An apparatus as in claim 15, where the downlink is implemented using a multiple input multiple output MIMO system with quadrature phase shift key QPSK modulation.

20. An apparatus as in claim 15, where the downlink is implemented using a multiple input multiple output MIMO system with quadrature amplitude modulation QAM.

21. An apparatus as in claim 15, further comprising a feed-back path for feeding back an output from the Kalman filter to a channel estimator to obtain a stronger effective pilot signal.

22. An apparatus as in claim 15, further comprising a path for providing chip reliability estimates from a filtering error covariance matrix $P(k|k)$ of the Kalman filter to a soft demodulator and decoder.

23. An apparatus as in claim 15, further comprising means for estimating a current channel state $x(k)$ using L future samples obtained from a fixed-lag Kalman smoother.

24. An apparatus as in claim 15, where the Kalman filter comprises a square root Kalman filter.

25. An apparatus, comprising:
a receiver for receiving a downlink code-division multiple access CDMA channels;
a mean square error (MSE) equalizer for performing single-user detection of a signal received from the downlink CDMA channel, said equalizer comprising a Kalman filter having an input coupled to the received signal for generating a best linear unbiased estimate of a transmitted chip sequence for a single user; and
a channel estimator configured to receive the received signal as an input and configured to provide a channel estimate as an input to the Kalman filter.

26. An apparatus as in claim 25, where $l_s$ denotes a number of consecutive time steps over which a state-space model can be considered stationary, where $l_t$ denotes the settling time as a number of steps required for the Kalman filter to converge, where $l_s$ is on the order of the coherence time of the channel such that $l_t \ll l_s$, further comprising, in each window of $l_s$ time steps, means for updating a Kalman filter prediction error covariance matrix $P(k|k-1)$, a Kalman filter filtering error covariance matrix $P(k|k)$ and the Kalman gain $K(k)$ only during the first $l_t$ steps for reducing the computational complexity of the Kalman filter.

27. An integrated circuit comprising:
an equalizer configured for use with a code division multiple access received signal, said equalizer comprising a Kalman filter adapted to generate a best linear unbiased estimate of a transmitted chip sequence from the received signal for a single user; and
a channel estimator configured to receive the received signal as an input and configured to provide a channel estimate as an input to the Kalman filter.

28. The integrated circuit as in claim 27, where $l_s$ denotes a number of consecutive time steps over which a state-space model can be considered stationary, where $l_t$ denotes the settling time as a number of steps required for the Kalman filter to converge, where $l_s$ is on the order of the coherence time of the channel such that $l_t \ll l_s$, further comprising, in each window of $l_s$ time steps, circuitry to update a Kalman filter prediction error covariance matrix $P(k|k-1)$, a Kalman filter filtering error covariance matrix $P(k|k)$ and the Kalman gain $K(k)$ only during the first $l_t$ steps.

29. The integrated circuit as in claim 27, where the code division multiple access received signal is received from a single input single output SISO system that uses quadrature phase shift key QPSK modulation.

30. The integrated circuit as in claim 27, where the code division multiple access received signal is received from a single input single output SISO system that uses quadrature amplitude modulation QAM.

31. The integrated circuit as in claim 27, where the code division multiple access received signal is received from a multiple input multiple output MIMO system that uses quadrature phase shift key QPSK modulation.

32. The integrated circuit as in claim 27, where the code division multiple access received signal is received from a multiple input multiple output MIMO system that uses quadrature amplitude modulation QAM.

33. The integrated circuit as in claim 27, further comprising a feed-back path for feeding back an output from the Kalman filter to a channel estimator to obtain a stronger effective pilot signal.

34. The integrated circuit as in claim 27, further comprising a path for providing chip reliability estimates from a filtering error covariance matrix $P(k|k)$ of the Kalman filter to a soft demodulator and decoder.

35. The integrated circuit as in claim 27, further comprising circuitry for estimating a current channel state $x(k)$ using L future samples obtained from a fixed-lag Kalman smoother.

36. The integrated circuit as in claim 27, where the Kalman filter comprises a square root Kalman filter.

37. The integrated circuit as in claim 27, where said equalizer is embodied at least partially in software that is tangibly embodied in the integrated circuit.

* * * * *